Figure 1:
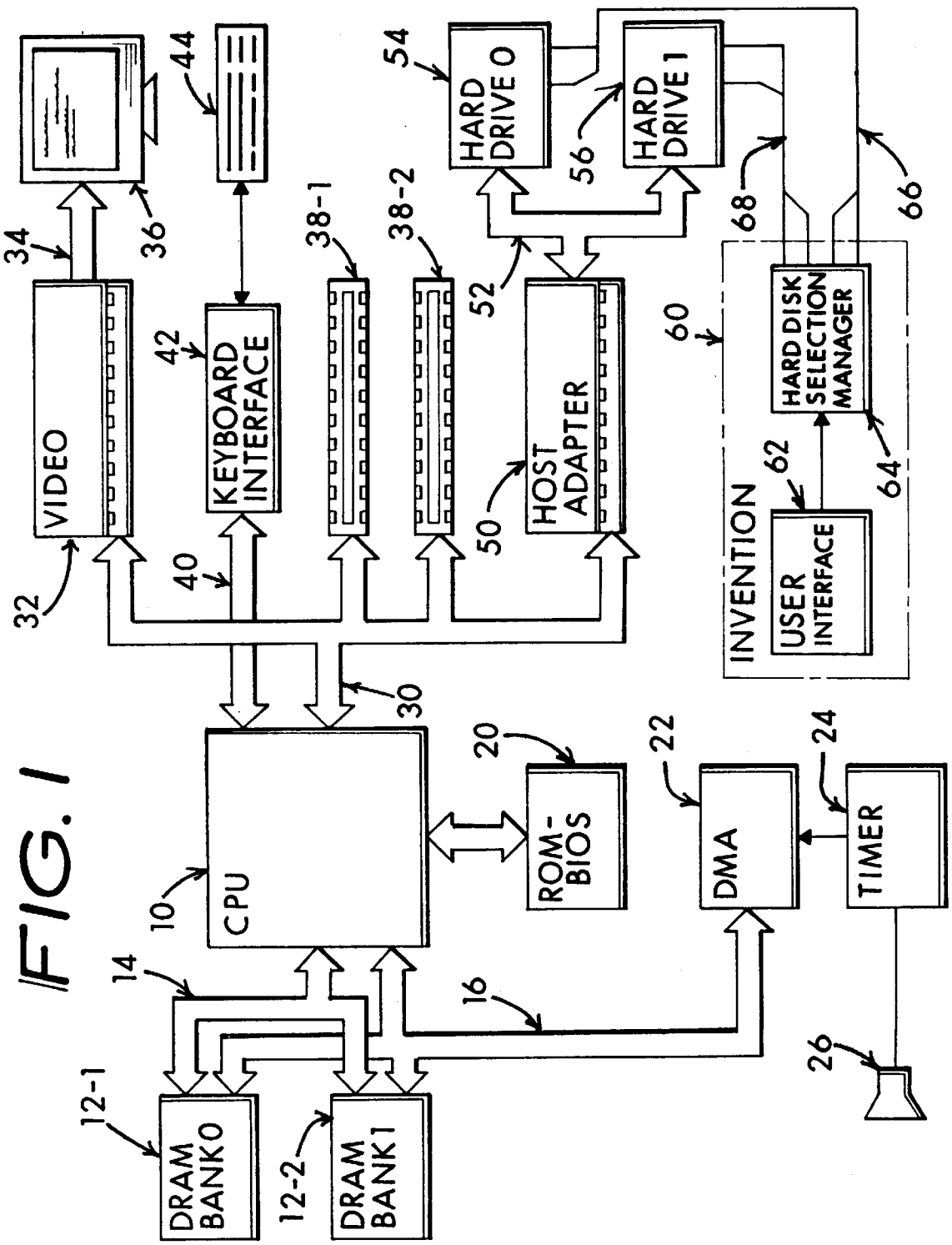

United States Patent [19]

Weber

[11] Patent Number: 6,067,618

[45] Date of Patent: May 23, 2000

[54] MULTIPLE OPERATING SYSTEM AND DISPARATE USER MASS STORAGE RESOURCE SEPARATION FOR A COMPUTER SYSTEM

[75] Inventor: Harold J. Weber, Holliston, Mass.

[73] Assignee: Innova Patent Trust, Centerville, Mass.

[21] Appl. No.: 09/048,304

[22] Filed: Mar. 26, 1998

[51] Int. Cl.[7] .................................................. G06F 9/00
[52] U.S. Cl. .................................. 713/1; 713/2; 713/200
[58] Field of Search ................................. 713/2, 1, 100, 713/200

[56] References Cited

U.S. PATENT DOCUMENTS

| 5,640,562 | 6/1997 | Wold et al. ................................. 713/2 |
| 5,675,795 | 10/1997 | Rawson, III et al. ...................... 713/2 |
| 5,887,163 | 3/1999 | Nguyen et al. ............................. 713/2 |
| 5,920,709 | 7/1999 | Hartung et al. .......................... 395/309 |

*Primary Examiner*—Dennis M. Butler

[57] ABSTRACT

A computer system including several nonconcurrently active hard disk drives ordinarily loaded with unique software bundles. Each active hard drive introduces an especial operating system setup and applications installation which is unconditionally denied access by activities obtained under another hard disk drive's software instructions. An absolute isolation between two or more user's application programs and data files is achieved while sharing a common set of computer system hardware and peripherals. Each category of nonconcurrent user operates independently without a threat of corruption from activities of another prior or subsequent user utilizing the same computer system for another disparate activity. In an IDE/ATA interface environment, a typical arrangement includes a setting of ROM-BIOS to only recognize a MASTER drive with a subsequent user determined swapping of MASTER and SLAVE modes between at least two hard drives utilizing a manual switch-over to obtain operation under operating system and programs uniquely installed on each of the intently selected MASTER drives, while denying access to the alternant SLAVE drive. In an SCSI interface environment, several drives set with the same SCSI-ID number are selected between by manually controlling a completion of the SCSI bus SEL line to the active intended drive and interrupting the SEL line to designated inactive drives. Virus corruption of one primary drive is fire-walled against inadvertent transfer into an alternate primary drive thereby assuring system operating integrity for one user category in spite of virus contamination, command errors, or careless or malicious hacking introduced by another user category.

20 Claims, 14 Drawing Sheets

MULTIPLE OPERATING SYSTEM AND DISPARATE USER MASS STORAGE RESOURCE SEPARATION FOR A COMPUTER SYSTEM

BACKGROUND OF MY INVENTION

A personal computer of the widely utilized "IBM-type", including the many clones and variations made by Dell, Hewlett-Packard, Compaq, Gateway-2000, Micron, Packard-Bell, ProGen, Digital-Equipment and many, many other makers is the type of computer system for which my invention is particularly intended. This type of computer commonly includes a microprocessor manufactured by Intel, Cyrix or AMD. For example, the Intel Pentium class is a particularly well established microprocessor family in contemporary personal computer designs. A variation on the entrenched microprocessor is also demonstrated by a StrongARM™ which is a RISC design licensed by Advanced Risc Machines Ltd., Cambridge, England to Digital Equipment Corp., Maynard, Mass. (as acquired by Compaq Computer). This StrongARM™ device is said to be capable of running under nine different operating systems and currently finds application in Apple Computer Inc.'s Newton™ hand-held computer, as well as in an internet-ready telephone produced by Phillips Electronics-NV, and other consumer and commercial applications.

The usual PC embodiment, as upgraded from the original IBM Corp. design circa 1982 includes a microprocessor, DRAM and a ROM-BIOS which together with floppy disk and hard disk drive interface circuitry and miscellaneous housekeeping circuitry comprises a motherboard into which various function cards (or daughterboards) are plugged. The most common plug-in card is for the color video display and currently of a category known as SVGA (super video graphics array).

In a usual computer configuration, at least one hard disk drive is utilized as "Drive C" which includes "boot tracks" (track ∅) holding software code for an underlying operating system, such as the initial portion of Microsoft's "Windows 3.11 for Workgroups", for example. During a "cold boot" start-up, the ROM-BIOS introduces operational code to the microprocessor which steps the system through a subsequential series of self-test and initialization steps, including memory verification. ROM-BIOS is a distinctly separate boot code contained on EPROM or FLASH-PROM integrated circuits and ordinarily provided by vendors under the names of Phoenix-BIOS, AMI-BIOS and Award-BIOS. Furthermore, the ROM-BIOS is uniquely tailored to the associated motherboard circuitry. Once these ROM-BIOS code functions have been mostly satisfied, operation is transferred to the boot track ∅ of the Drive C. This boot track includes system files which define the fundamental operational character of the computer once it is in full operation.

Unlike the ROM-BIOS boot code, the boot track ∅ code on the Drive C is somewhat more "generic" or universal in character, that is it is not necessarily tailored to the particular computer with which it is associated, but rather is quite the same for nearly every computer. For example, with the mentioned Microsoft Windows 3.11, the most fundamental boot files ordinarily include the IO.SYS and MSDOS.SYS files, which are actually a part of the underlying Micrcosoft MS/DOS 4, 5 or 6 operating system.

Separate CONFIG.SYS and AUTOEXEC.BAT files are utilized to tailor the software to the unique accessorial configuration of a given computer system. In addition a COMMAND.COM file is ordinarily included to provide the underlying interfacial support and operational character to the operating system.

In this typified Microsoft setup, the Windows 3.11 acts essentially like a shell program which resides above the typical MS/DOS 6.2 (or equivalent) operating system installation. These system files couple with the COMMAND.COM file in the system's root directory and together the combination affords the most fundamental functional aspects of the operating system. As is well known, many other files under the C:\DOS and C:\WINDOWS directory (or equivalent) develops the full character or "style and feel" of the Windows 3.11 operating system.

Windows-95 is a contemporaneous "operating system", arguable as to whether it is a shell program that includes an underlying and transparent MS/DOS 7 operating system. The intermix of MS/DOS and Windows programs portions are so thorough with Windows-95 that the Windows-95 portions can not be readily stripped from the MS/DOS 7 portions and subsequently operated solely in the MS/DOS 7 mode. As a result, it is relatively safe to say that the Windows-95 is an operating system or at the very least, a de facto operating system.

Hardware Sharing Two Operating Systems

A single computer may support two or more absolutely incompatible operating systems if some way is provided for determining the unconditional choice of a preferred operating system during start-up initialization. Almost without exception, it is preferable that the current or active operating system for a computer be booted up through Drive C. At least this is currently the usual procedure for most personal computers. For example, with personal computers using IDE/ATA interface bus coupling of the hard drive(s), the MASTER is ordinarily recognized as Drive C. Comparably, with a SCSI interface bus coupling of the hard drive(s), the hard drive set with an SCSI-ID ∅ (SCSI device identification) is similarly recognized as Drive C.

Primarily this determination is made because many programs make fundamental assumptions that the underlying operating system components are indeed going to be found on Drive C. It is also preferable because, during installation of a major program such as a full-capability wordprocessor, or desktop publishing software the configuration of the program is often done relative with the Drive C.

As a result, if two or more operating systems are to be used on the same personal computer, the selected active operating system must be configured to "look like" Drive C in order to assure best operational results.

In such an arrangement, Microsoft Windows 3.11 and Microsoft Windows-95 may both be run on the same machine, if the system boot data for the selected operating system is made to unequivocally appear to reside on Drive C.

It is perhaps even more desirous that some capability be retained in a contemporary computer to run raw MS/DOS software, such as games and business programs into which a user may already have made a considerable investment. As a result, it is not at all unusual to prefer that a computer can be brought up under Windows-95 for contemporary programs, while alternatively the same computer can be initialized under a generic MS-DOS operating system such as MS-DOS 6.2 in order to run programs purchased by the user only a few years earlier.

While it is indeed possible to run many MS-DOS programs under Windows-95, recall that MS-DOS 6.2 (for example) affords many singular operating features which have been dropped from the usual MS-DOS 7 portion of Windows-95. More importantly, earlier MS-DOS DOS-SHELL program formats are only available under the earlier versions of MS-DOS, such as MS-DOS 6.2.

In addition to the mentioned combinations, many power users utilize Microsoft Windows-NT as a preference for business applications. The contemporary Windows-NT versions include 3.51 and 4.0, with version 5.0 eminent. In this setting, it is particularly bothersome to a user if the only available system is the Windows-NT Workstation 4.0 installation. It is absolutely unexceptional for business programs and games which were not explicitly intended for use under Windows-NT to inadvertently crash, if they will even install and initialize properly. Part of the reason for this is that the Windows-NT system utilizes different device drivers and is furthermore lacking many older type device drivers.

A variety of applications may be incompatible with Windows-NT. For example, those programs which are display-intensive, such as paint programs may fail. Also, programs that directly access scanner, fax or terminal emulation cards may fail. Other software which may fail includes those programs that access the hardware directly or rely on their own device drivers—either for printers, disk drives scanners or video cards. This type of software fails primarily because Windows-NT only accesses the hardware through the Win32 API or the Windows-NT Executive. As a result, "grandfathering" an earlier printer, function card, or other device into the overall operating system and program combination becomes difficult if not impossible. The obvious result is the inevitable system crash, usually occurring at the worst possible moment.

The same computer, equipped to run two distinctly different operating systems such as the mentioned industrial-strength Windows-NT Workstation 4.0 and the more versatile Windows-95 or Windows-3.11 may make for a far more forgiving combination insofar as accepting older programs or non-32 bit game software.

Various combinations of operating systems must be available to many power users in order to obtain optimum computer utilization. Typical of the categories of operating systems or pseudo-operating systems include:

Windows NT Workstation 3.51
Windows NT Workstation 4.0
Windows 95
Windows 98
IBM OS/2
DR-DOS (Novell)
Unix
Linux
DOS 6.22 (and earlier variants)

Virtual and Real Drive Assignment

Programs are known which can reassign logical drive letters for purpose of redirecting disk requests from one disk to another. The long-used MS-DOS ASSIGN command can temporarily redesignate drive letters. For example,

C:\DOS\ASSIGN C=D D=C serves to redesignate Drive C as Drive D and conversely Drive D as Drive C. This is a virtual reassignment and unfortunately such reassignment is unpredictably temporal. Typically this mentioned reassignment, when placed in the AUTOEXEC.BAT file, may create a virtual swap of the C and D drive logical assignments, at least while operating under MS-DOS. With my invention, the reassignments are absolutely hardware established, non-virtual and thereby intrinsically stable in character.

AUTO-CAD™ and IMSI TURBOCAD™ Programs

Engineering and architectural oriented Computer Aided Design (i.e. CAD) programs, such as the ubiquitous AUTO-CAD™ and IMSI's TURBO-CAD™ are widely used for drafting and product design applications. These are massive programs including many ancillary files and subroutines. Speed of performance is of utmost essence in this sort of program environment, particularly if 3-D rendering and other high-end techniques are to be included as a part of the usual AUTO-CAD™ or TURBOCAD™ application.

As a result of these performance demands, it is clearly advantageous to have a dedicated computer system which carries the least amount of extraneous software overhead. This unburdens the software and hardware "housekeeping" functions to a minimum level, with the focus of the computer's functional operation being that of singularly satisfying the CAD program's requirements.

Since an expensive, high-end computer system with as much DRAM as possible is a best choice for CAD applications, simple economics dictates that whatever other office needs are required ought to be met on the same hardware base.

With my invention, I teach how two hard drives might be utilized with the same computer system to achieve this dual-role objective. A large hard drive, for example 6-gigabyte or larger drive might be selected for the CAD applications whilst only 1 or 2-gigabyte of drive space may more than satisfy the much less demanding business applications, such as word processing. Furthermore, the CAD program may preferably run under Windows-NT while the business programs may not be compatible with Windows-NT but rather require Windows-3.11, Windows-95 or even plain-vanilla MS-DOS. During boot-up the CAD oriented drive may be selected and brought up as the principal drive giving optimum access to the mentioned 6-gigabyte drive and loading a robust operating system such as Windows-NT optimized solely for the CAD program. Alternatively, if business functions are the current work objective, the computer may be re-booted to recognize the other smaller mentioned drive as the principal drive along with a more meager operating system. Also paramount in this is that the CAD images stored on the dedicated CAD drive can not be spoiled by any action whatsoever undertaken when running in the business program mode.

Software Selection of Operating System

Also known is a multi-operating system selection program based upon software selection of any one of several potential operating systems. The "SYSTEM COMMANDER" made by V-Communications is an example of this sort of software approach which essentially establishes separate hard drive partitions for holding separate operating systems. What it fails to do is establish an unequivocally separate one of two or more hard disk drive's as a dedicated Drive C system disk for unique usage by each of the selected operating systems, with the Boot Track Ø of the active Drive C utilized for boot-up of the immediately active operating system.

FIELD OF MY INVENTION

My invention pertains to the general field of personal computers utilizing a hard disk drive mass-storage medium and in particular when the personal computer is booted between the ROM-BIOS code and the program data files through boot track data usually stored on track 0 of the hard disk drive. My invention pertains most applicably to (but it is not solely limited to) that class of personal computers commonly known as "IBM-type" typically utilizing an Intel microprocessor and utilizing disparate operating systems, which may include combinations of similar operating systems such as Microsoft's Windows-95 and Microsoft's Windows-NT or conversely, widely different operating systems such as Novell's DR-DOS™, IBM's OS/2 and UNIX.

SUMMARY OF MY INVENTION

A personal computer system is provided with two or more hard disk drives, each of which may be independently assigned to a different user, a different operating system, or a different set of applications. When the computer system is booted, one of the hard disk drives is selected as the primary drive in order to establish the assigned operational characteristics for the computer as fixed by the unique combination of operating system configuration and applications programs installed on the selected drive. All other hard disk drives are ordinarily disabled and ignored, with a result that whatever activity occurs relative with the selected primary drive can have no effect whatsoever on the binary data stored on any unselected secondary drive. This provides each user or category of user with absolute immunity against violation of his unique operating system, application program setup and program data by another user, either through accidental or intentional access. It also substantially isolates a user against software virus insults which may be introduced by another user.

Class Definition of a User

For purpose of my invention a "user" may be inherently singular or plural and generically describes one or more individual persons utilizing a computer's software resources for a common or similar purpose. Furthermore, the same individual person may be a plural user. Sometimes a user may be referred to as an operator. The terms person and user are also intentionally gender neutral. For example, office workers who work with word processors, data bases and spreadsheets may define one class of user. A different class of user may be persons who regularly install and use games or spend time surfing the internet. Yet another user class may include those who use graphic design, desktop publishing or engineering oriented programs. A most notable example of "dual user", that being the same "person" who acts as two users may be an architect, for example. In such a setting, on one hand, as a "first" user he may maintain business records on the computer, including programs such as word processing, database files and the like. On the other hand, as a "second" he may maintain complex architectural or engineering programs and files, such as AUTOCAD or TURBOCAD.

Users may be further defined and sub-classed to include different levels of individual users having nearly the same software requirements. For example, clerical persons using database and word processing programs may be a user class distinct from management persons who may also utilize substantially the same programs. These are examples of two categorical levels of users who may be advantageously defined as separate classes and hence as different users for purpose of my invention.

In another relationship between users, two distinctly separate users for purpose of my invention's definition may merely be two or more children or teenagers who utilize the same shared computer system. In this setting it is desirous that one user can absolutely not accidentally or intentionally corrupt another user's data or program files.

A user may be singularly or plurally defined as being one or any number of individual persons utilizing the computer resources for a common purpose. As an example, in a home office setting the adult user operating the home office environment may be designated a "first user", while one or more children using the same computer hardware for an essentially conflicting purpose of homework preparation or game playing may collectively be designated as a "second user".

In my invention, a user is generally accepted as being a person who operates the computer through utilization of commercial software packages, such as Corel's WordPerfect, Microsoft's Office-97, Intuit's QuickBooks or any of a number of games such as DukeNuken-3D. In general such a plain-vanilla user has little or no knowledge of, or interest in, "behind the screen" hardware functions of the computer and therefore is ordinarily not a technical person.

Multiple Operating Systems

In one of its preferred forms my invention is a hardware determined multiple operating system selection method for use with a quasi-standard "IBM-type" computer system commonly called a "PC" and typically utilizing an Intel, AMD or Cyrix microprocessor. This type of ubiquitous computer configuration is described in detail in "*The Winn L. Rosch Hardware Bible*", $3^{rd}$ Ed., ISBN 1-56686-127-6, ©1994 SAMS Publishing, Indianapolis, Ind. 46290. Further information pertaining to this class of computers is found in "*The Indispensable PC Hardware Book*", $2^{nd}$ Ed., Hans-Peter Messmer, ISBN 0-201-87697-3 ©1995 Addison-Wesley Publishing Co., Wokingham, England. Realize that throughout my writing, the term PC shall imply the "IBM-type" unless otherwise said.

All PC systems include a ROM-BIOS. (a Basic Input/Output System stored in a Read Only Memory integrated circuit on the computer's motherboard). It is the purpose of the ROM-BIOS to "kick-start" the computer when it is first powered-up. A series of self-tests mostly involving the motherboard setup, memory check and accessory device configurations such as the video display, keyboard, mouse and other similar functional needs is the usual first sequence of steps spent by the ROM-BIOS activity. Typical ROM-BIOS software includes the AMIBIOS™ by American Megatrends Inc., typified by a release of May 6, 1996, identified as 41-P400-001437-00101111-101094-486AVIP-H and utilized with an AMD 5x86 133-MHz microprocessor. Another ROM-BIOS is represented by the AWARD MODULAR BIOS™ produced by Award Software Inc. and typified by a release version V4.51PG ©1984–1997 and utilized with an Intel Pentium+MMX 200-MHz microprocessor.

During the early stages of the ROM-BIOS boot cycle, a "setup" mode is ordinarily made available. By entering setup, typified by pressing the DEL key immediately upon cold-boot, the ROM-BIOS displays a local program which is used for fundamental setup purposes in defining system hardware configurations, operating modes, operational settings and so forth. I contend that any computer oriented artisan familiar with the operational underpinnings of the usual PC is also familiar with this available ROM-BIOS setup procedure.

IDE/ATA Hard-Disk Interface

Upon entering ROM-BIOS setup mode, one of the presented queries is for the user to define the available disk drive hardware. This includes not only the usual floppy disk drive(s), but also it includes the available hard disk drives. Most mid-performance class PC systems utilize an IDE, EIDE or ATA (or equivalent) drive interface standard for the hard disk drives. A few drive models representative of this class of hard disk drives include:

| Maker | Model | Capacity |
|---|---|---|
| SEAGATE | ST3323A Medalist ™ | 3.2-GB |
| MAXTOR | 84320D CrystalMax ™ | 4.3-GB |
| QUANTUM | QM32550TM-A Fireball ™ | 2.5-GB |
| FUJITSU | B43100UD | 2.6-GB |

The usual off-the-shelf computer system is ordinarily supplied with a single hard disk drive. However, that same computer usually includes a provision for installing extra hard drives as options. An IDE/ATA type interface bus ordinarily permits two hard drives on the same cable. A full discussion of the IDE/ATA interface protocols and technical details is satisfactorily provided in "*The SCSI Bus & IDE Interface*", by Friedhelm Schmidt, pp 31–72 published ©1998 by Addison-Wesley-Longman, Ltd.

Contemporaneous motherboards frequently include a dual IDE/ATA interface bus provision, including two separate connectors. In other words, such an arrangement may be used for up to four separate hard drives. Sometimes, one of the IDE/ATA devices is a CD-ROM drive, but it is common practice to provide a direct interface between the CD-ROM drive and a corresponding interface connection on an accessory plug-in sound card.

For purpose of my ensuing discussion, let us assume two hard disk drives are used. To further define this discussion, the two hard drives are each MAXTOR model 71084R drives providing 1.08-GB of storage. In accordance with Maxtor's instructions, the same drive can be used in the MASTER and in the SLAVE position. In the MAXTOR drive, this is ordinarily accomplished by swapping a jumper marked J20.

| Maxtor Hard Disk Drive Model 71084R | | |
|---|---|---|
| Jumper | Master/Single | Slave Only |
| J20 | ON (Jumpered) | OFF |

Other drive makes use other jumper settings and for a converse example the SEAGATE Models ST3491A and ST3660A drives require a jumper in order to define the slave drive, whereas a presence of no jumper defines the master drive position. This is substantially the opposite of the MAXTOR drive arrangement, but does not affect the substance of my invention's applicability.

I have found that I am able to select at least one of two installed drives by a procedure where the ROM-BIOS of the PC is set to only recognize a single hard disk drive. As a result, even if a second hard disk drive set to its SLAVE mode is present, it is absolutely ignored. This occurs because the computer's ROM-BIOS will only recognize a MASTER hard drive during initialization.

During physical installation of the two hard drives, I have extended connection of the J20 jumper pins to a DPDT or equivalent switch. With this arrangement, and by jumpering the common terminals of the DPDT switch, I have been able to transfer the MASTER mode back and forth between the two disk drives. If this selection is made prior to boot and initialization, the computer assumes whichever disk drive appears jumpered by the setting of the DPDT switch to the "the" MASTER drive position. As a result, the other drive is unequivocally ignored, because it appears to be a slave and as I earlier said, the ROM-BIOS is set to recognize only one hard drive. For an easy example, assume that hard drive number $0$ has Microsoft Windows-95 installed, together with miscellaneous application programs and games. Concurrently, hard drive number 1 has a version of UNIX (or LINUX) installed, together with UNIX-specific application programs. The user now has the ability to select between these code-incompatible operating systems with absolutely no possibility for cross-talk or binary corruption between the operating systems and any of the operating system's program files. The computer will have all the look and feel of two quite separate computer systems, depending upon which system boot mode occurs. The selection of the boot drives $0$ or 1 remains entirely under the absolute functional control of the user.

| SWITCH POSITION | ACTIVE HARD DISK DRIVE | ACTIVE OPERATING SYSTEM |
|---|---|---|
| A | #$0$ | Windows-95 ™ |
| B | #1 | Unix (or Linux) |

In this arrangement, when the switch is set to position A, drive $0$ becomes Drive C and drive 1 and its contents are unconditionally ignored. Alternatively when the switch is set to position B drive 1 becomes Drive C and drive $0$ and its contents are unconditionally ignored.

When a computer is already running under one operating system (say Windows-95 on Hard Drive $0$) the swapping of hard drives used in the manner for which I describe their arrangement will most likely lead to a total system crash. No hardware is likely to be damaged, but in-process programs and file data are likely to be corrupted.

To prevent total snarling of the software, I have found two approaches to be adequate in most computer utilizations. In the more straightforward method, whenever the DPDT switch is flipped additional contacts serve to signal a total RESET of the motherboard and all related circuit states. Of course this does nothing to preclude losing in-process files but it does prevent a catastrophic software crash which could conceivably damage data states on even the boot track $0$. In other words, using my embellish for auto-resist whenever the DPDT switch state is changed is at least no worse than having an unexpected power loss. In particular, if the DPDT switch is mounted on the computer's back panel, inadvertant switch-over is resisted. I anticipate that, a clever linkage may be engineered which will block switch state change of the DPDT switch whenever the computer's main power switch is in its ON state.

In a bit more sophisticated method I have utilized a relay configuration which defies change whenever the system is running.

A further method is to proved for the DPDT switch-over action in the form of a key-switch (or two or more separate key-switched uniquely assigned for each probable operator) which can only be changed using a suitable key, thereby resisting casual switch-about.

While I mention a DPDT switch action, this is merely to define one particular electrical embodiment. If drive types are mixed from different manufacturers, the switching action may be somewhat different than what the straight DPDT switching strategy suggests. I realize this complexity and my invention describes its resolution.

3 or More Drives on an IDE/ATA Bus

While conventional wisdom suggests that an IDE/ATA interface bus can support only two drives, I have found that an exception can be made if the following conditions are met:

1. One MASTER is assigned and all other drives are set as SLAVES.
2. The ROM-BIOS is set to recognize only a MASTER drive and ignore any SLAVE drive.
3. The IDE/ATA or EIDE adapter has sufficient line driver reserve to handle any capacitive and dynamic loading presented by the input line receivers of the additional drive or drives.

If these criteria are met, an ordinary IDE/ATA or EIDE bus can be utilized to support a selection of one out of three or more hard drives all concurrently coupled with the same IDE/ATA bus. Under this operative mode, I propose that each of the hard drives be accessible to a common selection circuit which may be a multi-position switch or a daughter-card which can variously set any one of the hard drives as the physical drive $0$, designated MASTER or primary drive, and usually identified as logical Drive C. At the same time, all the other drives must be set to their physical drive $1$ SLAVE mode

"Scuzzy" Hard-Drive Interface

A Small Computer Systems Interface or SCSI, sometimes nicknamed "scuzzy" is a system-level interface that provides what is essentially a complete expansion bus into which numerous peripherals may be plugged. It also functions like a sub-bus, that is SCSI devices can readily exchange data amongst themselves without the intervention of the host computer's microprocessor.

As is well known, the SCSI standard evolved from the Shugart Associates Standard Interface, or SASI, developed circa 1981 with NCR Corporation. The ANSI adapted the essence of the SASI specifications, subsequently to become approved by ANSI and known as the SCSI standard in 1986. Revisions to the original SCSI standard came along, with the SCSI-2 version introduced in 1991, while almost immediately thereafter, the SCSI-3 version was drafted in 1996. More contemporaneous versions have since been proposed and for purpose of my invention the generic term SCSI is intended to include any subsequent version or update of the SCSI specifications. Furthermore, for purpose of my invention I confine discussion of the SCSI to hard disk drives and peripheral mass storage mediums which may appear as logical Drive C devices (or the functional equivalent) to the overall computer system. A full discussion of the SCSI interface protocols and technical details is satisfactorily provided in Friedhelm Schmidt's "*The SCSI Bus & IDE Interface*", pp 87–175 & pp 253–286.

Internal hard disk drives typically utilize a 50-conductor flat ribbon cable to which two or more connectors are affixed. One of the connectors plug into the host adapter whilst the remaining connector(s) plug into the SCSI hard disk drive(s) and sometimes other SCSI compatible peripheral devices.

While the standard SCSI interface has 50 lines (or 68 lines), a few niche-applications utilize 25-pin D-shell connectors. For example, this 25 line interface is the scheme selected by Apple Computer Inc. for use with its Macintosh™ line of personal computers.

Under the SCSI-3 specification a 68 pin connector is utilized, together with a 68 line ribbon cable. Sometimes this "wide-SCSI" arrangement is called a "P-cable" and it may service up to 15 different devices. Realize that the $8^{th}$ device (e.g., SCSI-ID no.15) is usually assigned to the host adapter.

Ordinarily a hard drive includes an SCSI address selection provision, either embodied as jumpers or as a switch. The device's SCSI-ID address may be set to any available device address. In a usual configuration, the primary hard drive is given an SCSI-ID $0$ and a secondary hard drive is assigned an SCSI-ID $1$.

Conventional wisdom amongst computer artisans is that the SCSI-ID number must be unique and never shall two or more devices be assigned the same SCSI-ID number.

My invention's fundamental novelty is achieved by intentionally violating this technical canon and assigning the same SCSI-ID number to two or more SCSI disk drives. Whereas this would appear to be a travesty, since the SCSI bus would call-up (e.g., select) all of the identically-numbered disk drives and the system would crash, I have utilized this ordinarily disastrous address conflict to practice my invention's distinct advantage.

As I will show later on, by modification of the intercoupling ribbon cable, or by usage of a line-selection daughtercard, I can achieve a hardwired and thereby safeguarded selection of a physical hard drive $0$ or a physical hard drive $1$ to operate as the necessitous primary drive, usually logical Drive C.

SCSI Uses Cabling Adaptation

In its most eloquent presentation, I simply physically-interrupt and thereby deny the /SEL line signal to one or the other of the like-addressed SCSI hard drives. Usual SCSI implementation configures the /SEL line as active-low and indicated by my symbology. In the usual setup where the active SCSI hard drive is also the system boot drive, I show the use of an SCSI-ID of $0$ for both physical drives $0$ and $1$. This makes whichever physical drive having the completed /SEL line interface the boot drive. As with the IDE/ATA drives, this selection can be controlled by a physical selector switch, a key switch, or remotely with one or more relays. This approach does not violate SCSI "standards", since the host and devices retain their conventional SCSI connector configurations. All changes from the usual practice are confined to the intervening SCSI cable construction engineered for a given computer or family of computers.

While I mention the specific usage of the /SEL signal line for enablement/disablement control under the premise of my invention, you shall not limit my invention's operability to the /SEL line but it shall include any signal lines which may control a hard drive's functionality at least to the extent required for my invention's practice.

Independent Drives for Multiple Users

A computer may be used for multiple users. Due to the economics of buying a computer, it is often more justifiable to buy a best-available system and share it between two or more disparate users. A common example is the home office environment wherein a computer and operating system combination is chosen to afford the optimal business application benefits. In contrast, the same computer may duplex as a household computer intended primarily for Internet usage, schoolwork and games.

One of the most common problems with this sort of arrangement is that sharing the same machine between business and children can set the stage for catastrophic system crashes and possibility for major file corruption. These crashes can lead to corrupted or devastated business files with the result that a small business may be sorely damaged to the core. Such losses may include:

>Customer information
>Sales Records and Leads
>Accounts Receivable
>Accounts Payable
>Payroll Data and Taxes
>IRS Data and Information The potential for loss of this sort of data is significant, especially when a child or teenager is allowed free-reign over a computer during permitted periods of time. The vulnerability for loss may be fully non-intentional. The real problem arises when a zealous albeit well-meaning teen-nerd decides to dice about on the hard disk using any of the widely available utilities. A reformat or other erroneous action could quickly lead to the loss to some or all of the business oriented data bases.

Know well that loss of data is the primary concern, because application programs can generally be re-installed if the time is available. Playing around with the underlying MS-DOS portion of Windows-95 is sometimes tempting to the technically curious. As a result of simply typing:

C:\FORMAT C:

under the MS-DOS mode the entire drive C can be overwritten with format data. This includes the boot sector 0.

Reaching even further into the bowels of the usual computer is the MS-DOS FDISK command which can completely wipe-out a systems files in toto. Fortunately some safeguards are built into FDISK which renders it somewhat more difficult to accidentally utilize than what the FORMAT command is. Additionally, available products such as the variations of Symantec's "Norton's Utilities" are tempting to use and to the unwary can introduce disk-write errors which can corrupt data.

Tampering with another user's files or even accessing and reading another's files is a malicious intrusion of privacy in most instances. However, ordinary PC systems provide negligible safeguards aside from user-password protection on some programs.

With my invention, certainly two classes of users may utilize the same computer with little if any likelihood for crossover through software. Set up like I have described for operation with separate operating systems, each one of the available hard drives may include a fully independent operating system, even if it is the same operating system. For example, each hard drive may have Windows-95 installed. It is even reasonable that the SAME Windows-95 software CD-ROM or installation disks be used for installation on both hard drives without copyright consideration. Look at it this way, the same software is installed on two (or more) hard drives supported by a common motherboard means that the software usage benefits the same computer and only initialization varies.

When a business user installs the usual suite of business oriented word processing, data base, spread-sheet and accounting software the Windows-95 operating system is specifically optimized to run these kinds of programs with efficiency.

When a non-business user installs a set of software supporting games, educational programs, Internet browsers and other such non-business applications the Windows-95 is again initialized for optimum usage of this non-business class of programs. Additionally, limiting Internet access to the non-business operating system forestalls virtually all virus attacks which may otherwise invade the business files.

As this shows, a shared computer may be made virtually impervious to accidental and even mildly intentional events which can otherwise devastate critical data in the contemporary computer system.

In this multi-user configuration, the personal computer may also support the optimal operating system for an intended application. For example, the business user may find Microsoft Windows 3.11 or Windows-NT a more suitable choice due to familiarity of usage and an available business program base. In contrast the child or teenager who is game-oriented may find that MS-DOS or Windows-95 is a far better choice, due to improved game performance. For that matter, not all games will necessarily run under Windows 3.11, or especially under Windows-NT.

Schoolroom Environment

Computers in school, library and other similar environments are often shared by a number of students or users. In the classroom setting, a common computer system may be shared by two or more student-users on a regular basis. One of the weaknesses of this arrangement is a possibility, or more to the point a likelihood, for an occasional malicious prank or commission of an inadvertent error by one student-user that may act to destroy the efforts of all of the other users who share the computer. Most noteworthy is the simple FORMAT command, or any of an number of similar ordinarily innocuous data corrupting commands, which typically lay hidden in the bowels of the operating system. A knowledgeable prankster or hacker can therefor wreck havoc with virtually any shared system.

With my invention's capability for hardware definition of active hard drive participation together with a hardwired (e.g., not software) oriented denial of access to any other available drives the efforts of others can be secured with a minimum of supervision.

Realize that while the focus of my invention has been brought forth relative with the prevalent "IBM-type" PC architecture, this shall not imply strict limitation of my invention's utility to that class of PC alone.

PC-Incompatible Computer Systems

Other computer makers, such as Apple Computer Inc., offer incompatible niche-application personal computers which may still benefit from my invention's hard-drive independence when implemented to hold not necessarily two different operating systems but rather two substantially different sets of application program configurations. In such an arrangement, one disk drive may hold program files relative with desktop publishing while another disk drive may hold program files intended exclusively for CAD applications, by way of example. For my purposes I sometimes use the term "APPLE equivalent" to include the originaal APPLE Macintosh as well as APPLE authorized clones and other computers based on system architecture which is similar, albeit not identical to, APPLE Computer Co.'s various products.

Industrial & Medical Computers

Industrial, scientific and medical applications utilizing the PC architecture are widespread. With my invention, a user of such a system may isolate any one of two or more applications or measurement data onto separately assigned hard drives which are protected against data crashes and data corruption which may otherwise occur as a result of a mishap in conjunction with software of operating error occurring on the primary (e.g., active) drive.

OBJECTIVES OF MY INVENTION

My invention's principal objective is to specifically select and thereby admit access to any one of two or more hard disk drives as the primary drive during the ROM-BIOS boot cycle while absolutely denying gainful access to any of the other unselected drives.

A goal of my invention is to provide support for at least two distinctly separate computer operating system installations, each uniquely tailored to an individualized environment.

A further object of my invention is to permit each of the distinctly separate computer operating systems to be of a distinctly different class, such as Microsoft Windows and UNIX or for that matter, some variant of JAVA™.

Still another object of my invention is to afford a fully optimized and uniquely configured operating system for at least two distinct and generally inconsistently compatible users, such as business and non-business.

Another object for my invention is to cross-mix two or more operating systems in one common computer hardware set whereby each of two or more user categories, such as business and non-business, may each have access to a dedicated operating system which best suits their intended needs.

Yet another object of my invention is to give individualized access to each of at least two separate hard drives wherein the active or selected hard drive can absolutely not access or damage data stored on the inactive or de-selected drive.

An urgent consideration of my invention is to confine Internet virus infection likelihood to contaminate or crash one operating system (usually designated as a potentially sacrificial OS) while the other higher-priority operating system is maintained to be absolutely shielded against crossover contamination.

A salient objective of my invention, particularly in a business environment, is to provide two duplicate operating systems and sets of application programs in an immediately runable state, irrespective of a head crash or other catastrophic event, thereby "saving the day" when a replacement computer may not be immediately available and time-is-of-essence for a computer assisted performance of some matter.

Another intent of my invention utilized in conjunction with Apple McIntosh computers is to achieve a maintenance of at least two duplicitous hard disk drives holding individualized sets of program, configuration and data files albeit not operating systems data each of which may be uniquely tailored to an individual user, such as a student, while avoiding a likelihood for corruption by another student's work.

It is these stated objectives and further methods and technical approaches which will be revealed to the knowledgeable artisan that serve to achieve the fundamental goals of my invention. These goals include a provision for a duplicitous operating system environment which may include absolute operating system installations which are nearly identical or widely divergent. Furthermore, I show absolute hardware independence between mass memory storage devices (e.g., hard disk drives) to thwart data crossover and to avert total system failure in event one of the hard disk drives crashes.

DESCRIPTION OF MY DRAWINGS

My invention is depicted on 14 sheets of drawings including 14 illustrative figures.

FIG. 1—Arrangement of a typical PC with my invention included.

Figure 2:
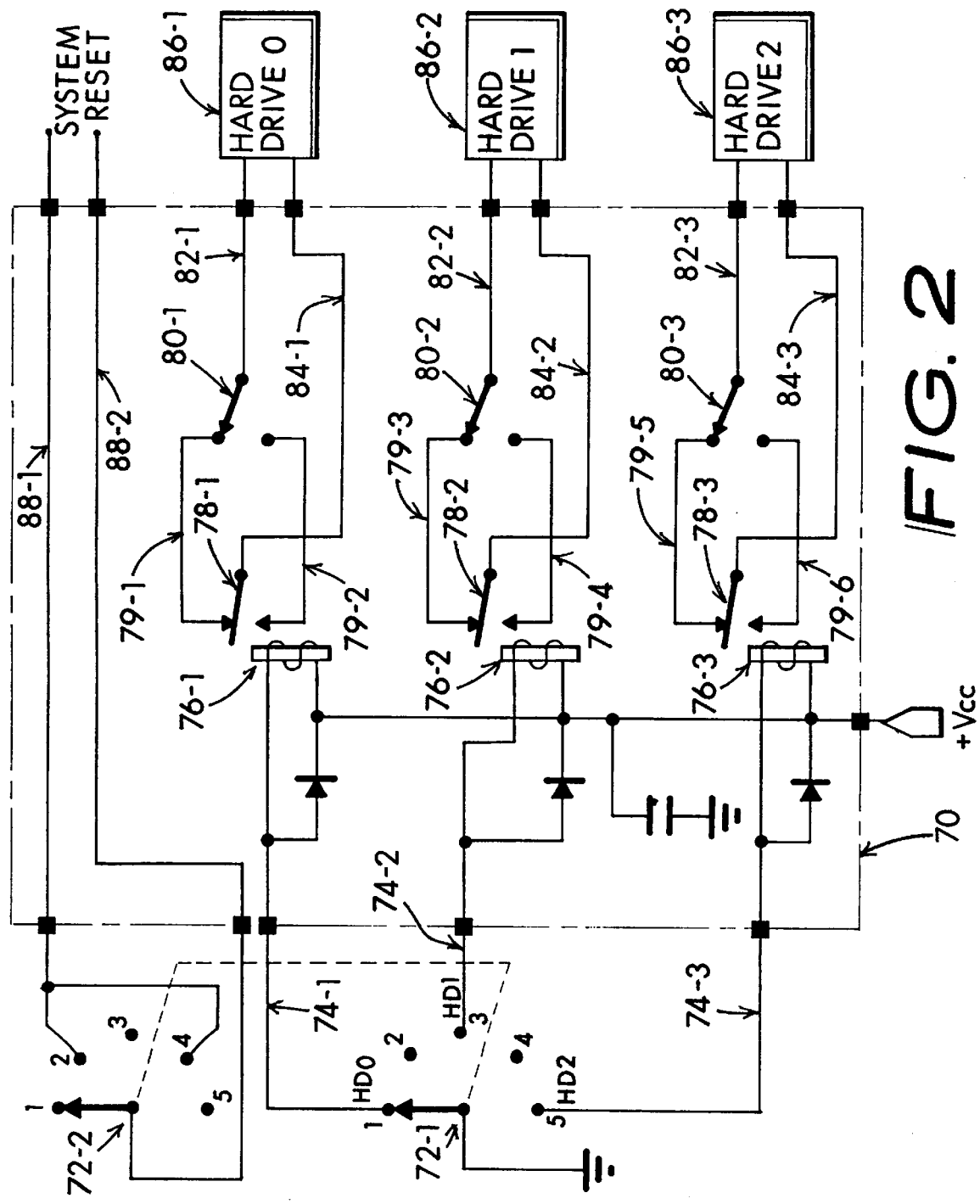

FIG. 2—Schematic of how MASTER/SLAVE jumpers may be modified on ATA drives using relays or switches to enable picking 1 out of 3 active and to automatically reset the computer when changes are made.

Figure 3:
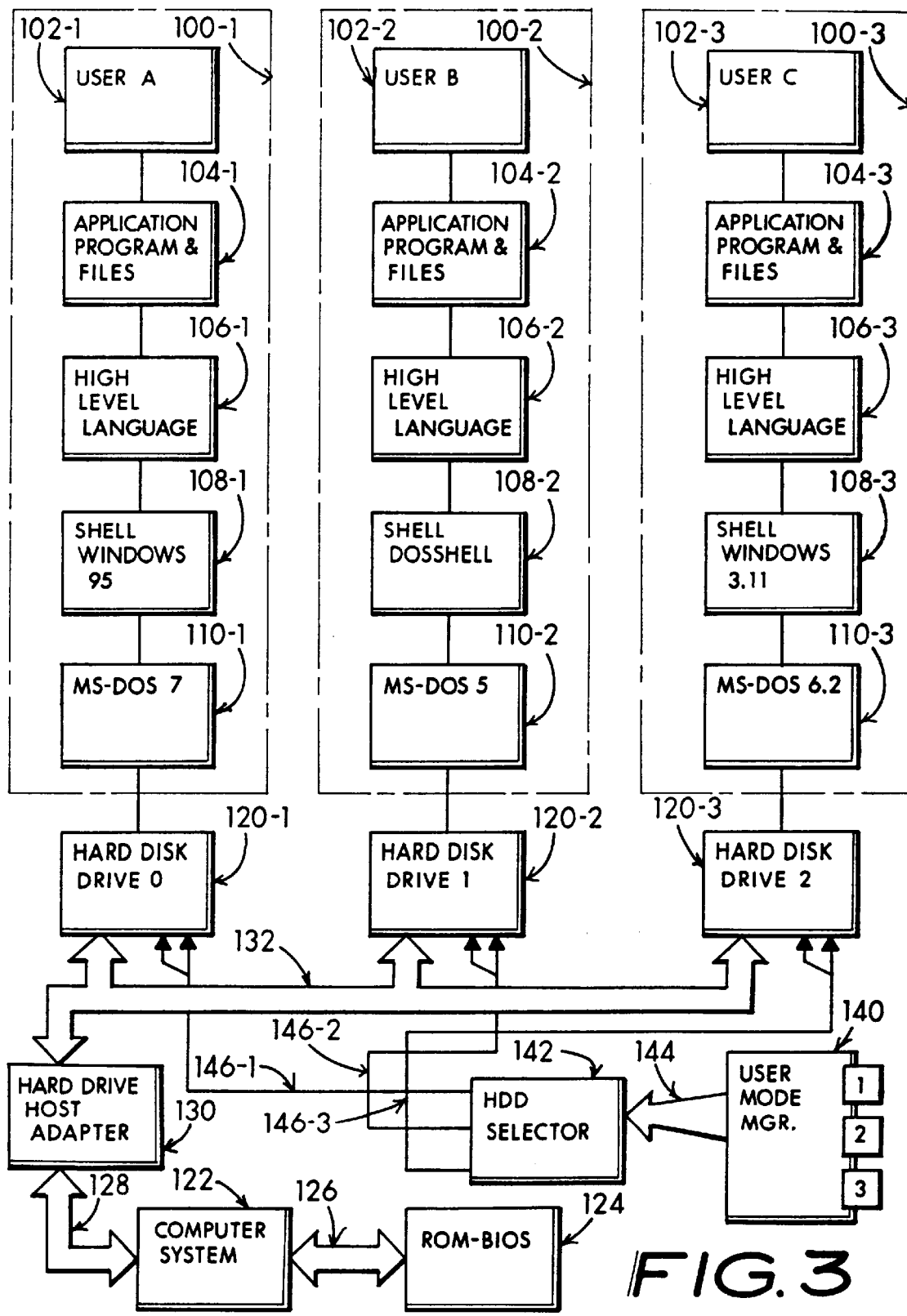

FIG. 3—Three software bundles are depicted as installed on three separate hard drives between which a user may select.

Figure 4:
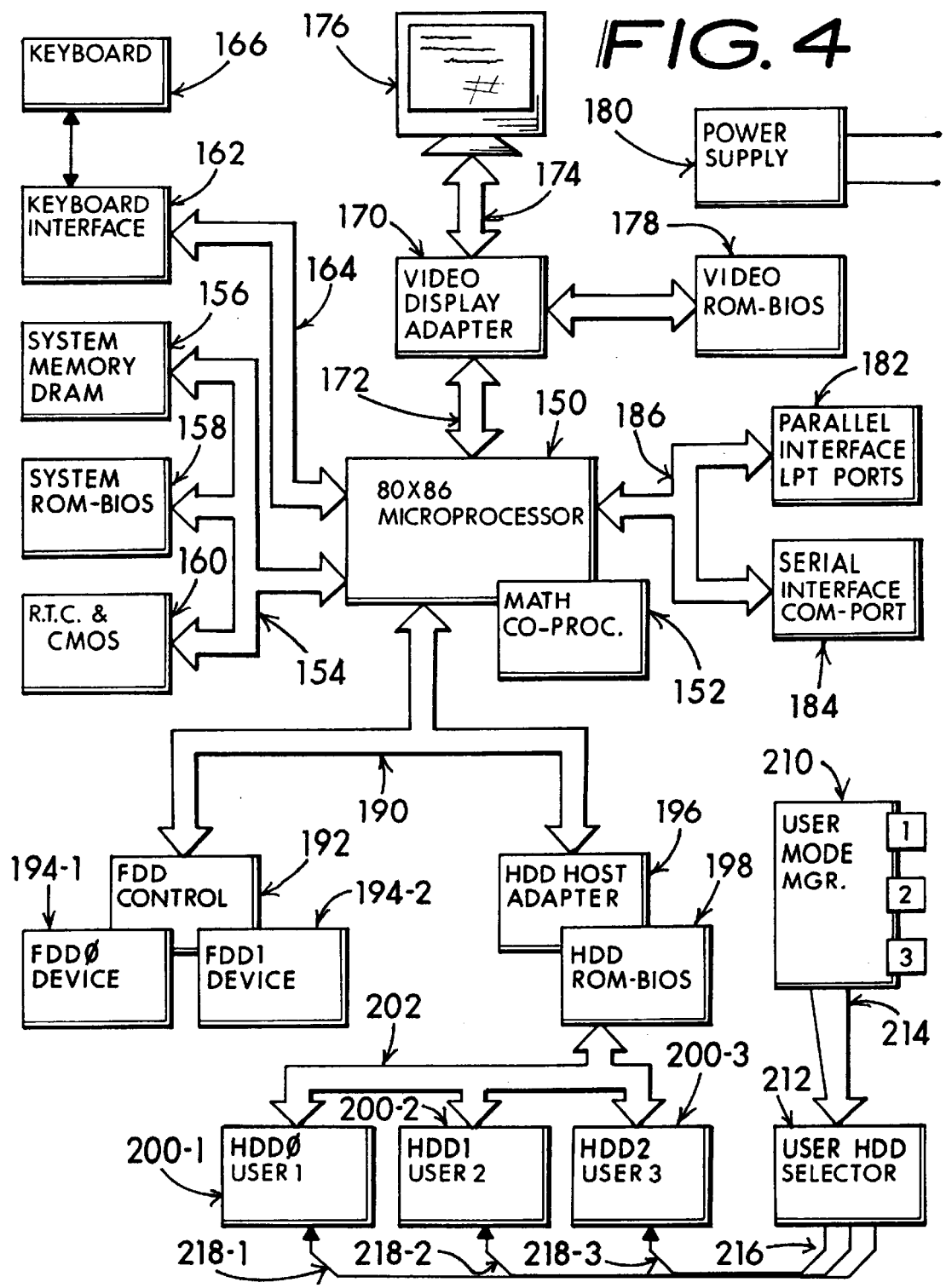

FIG. 4—Arrangement of a typical PC including three user-selectable hard disk drives.

Figure 5:
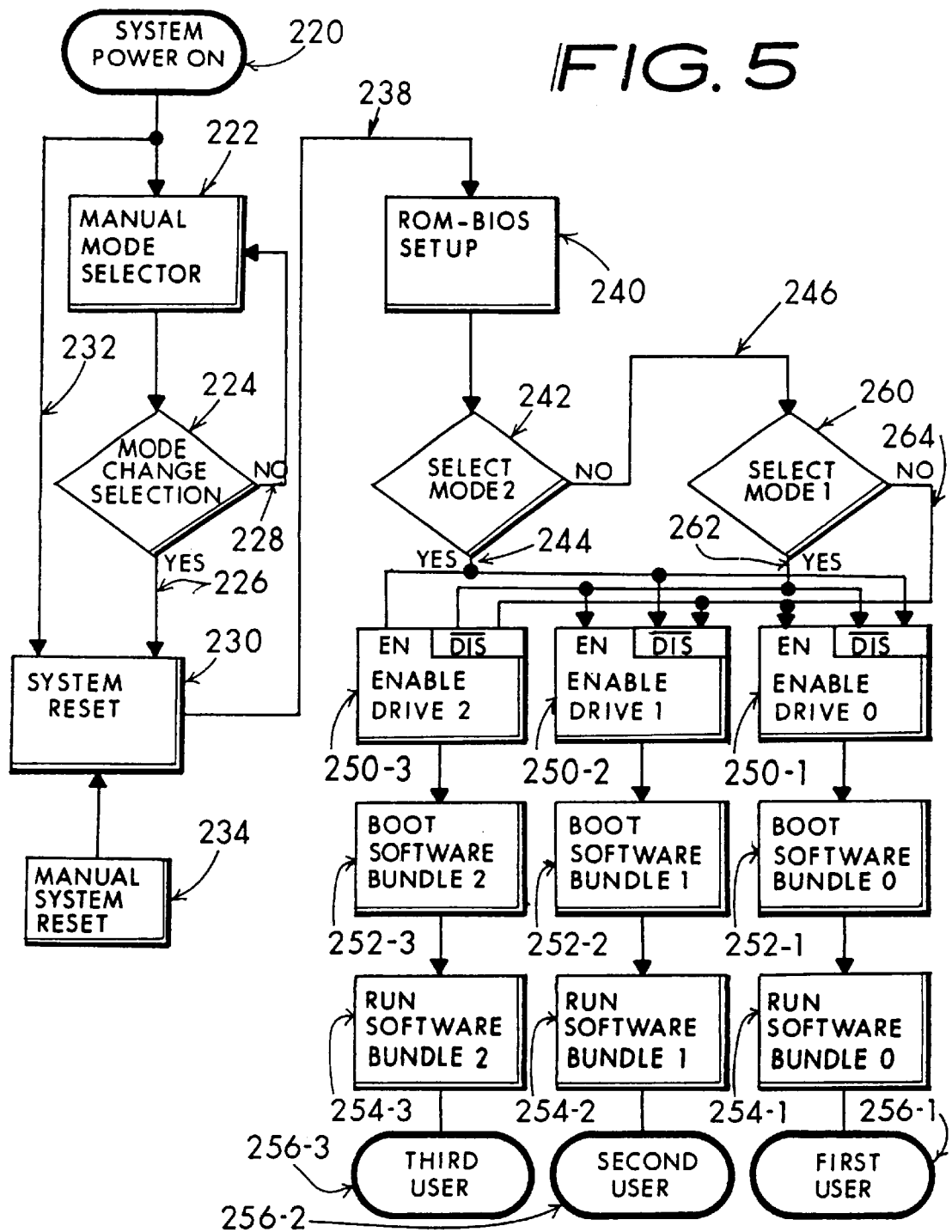

FIG. 5—A logic flow diagram depicting at least one preferred selection approach, especially as related to FIG. 4.

Figure 6:
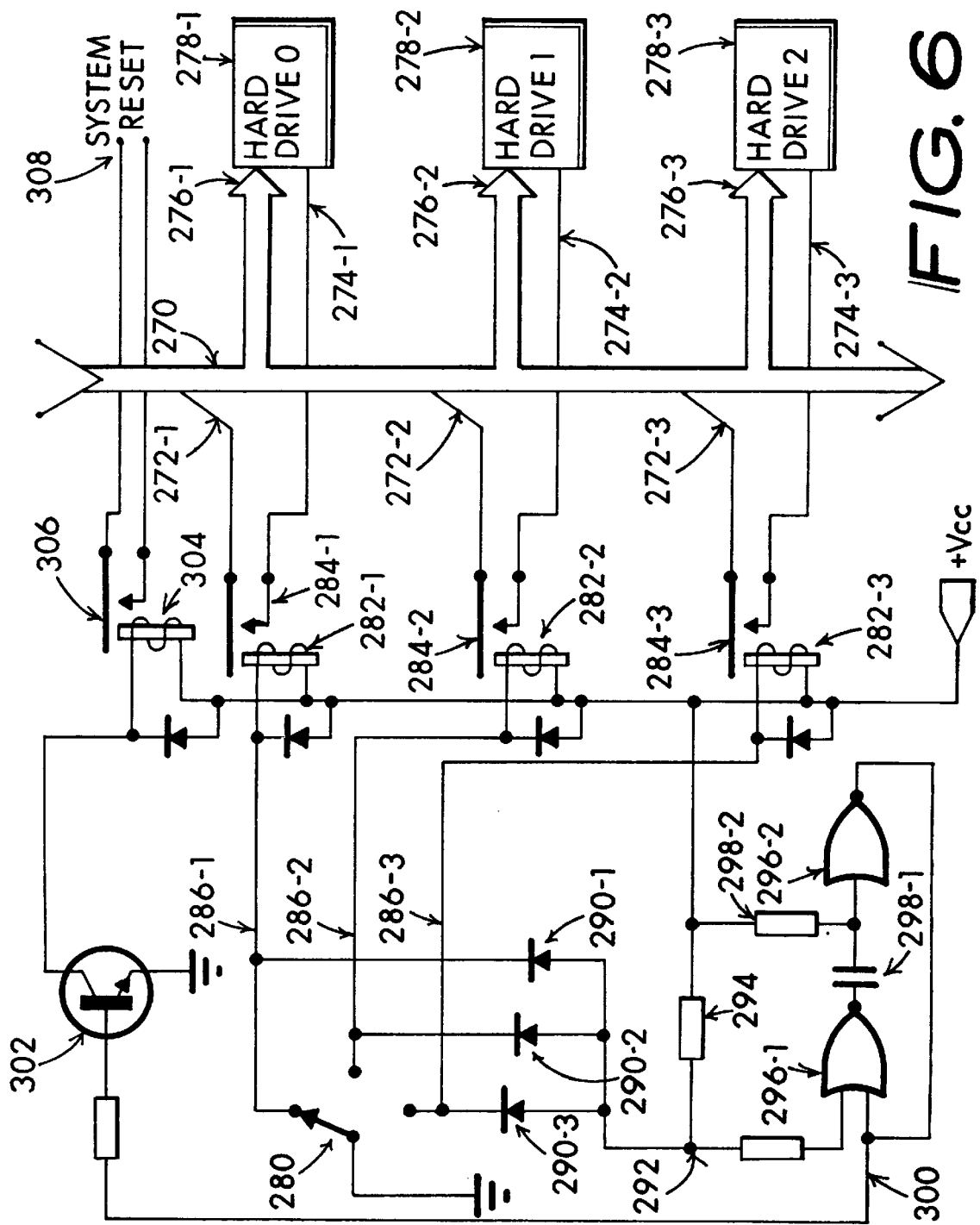

FIG. 6—An SCSI bus is adapted through relays to select any one of three hard drives as active.

Figure 7:
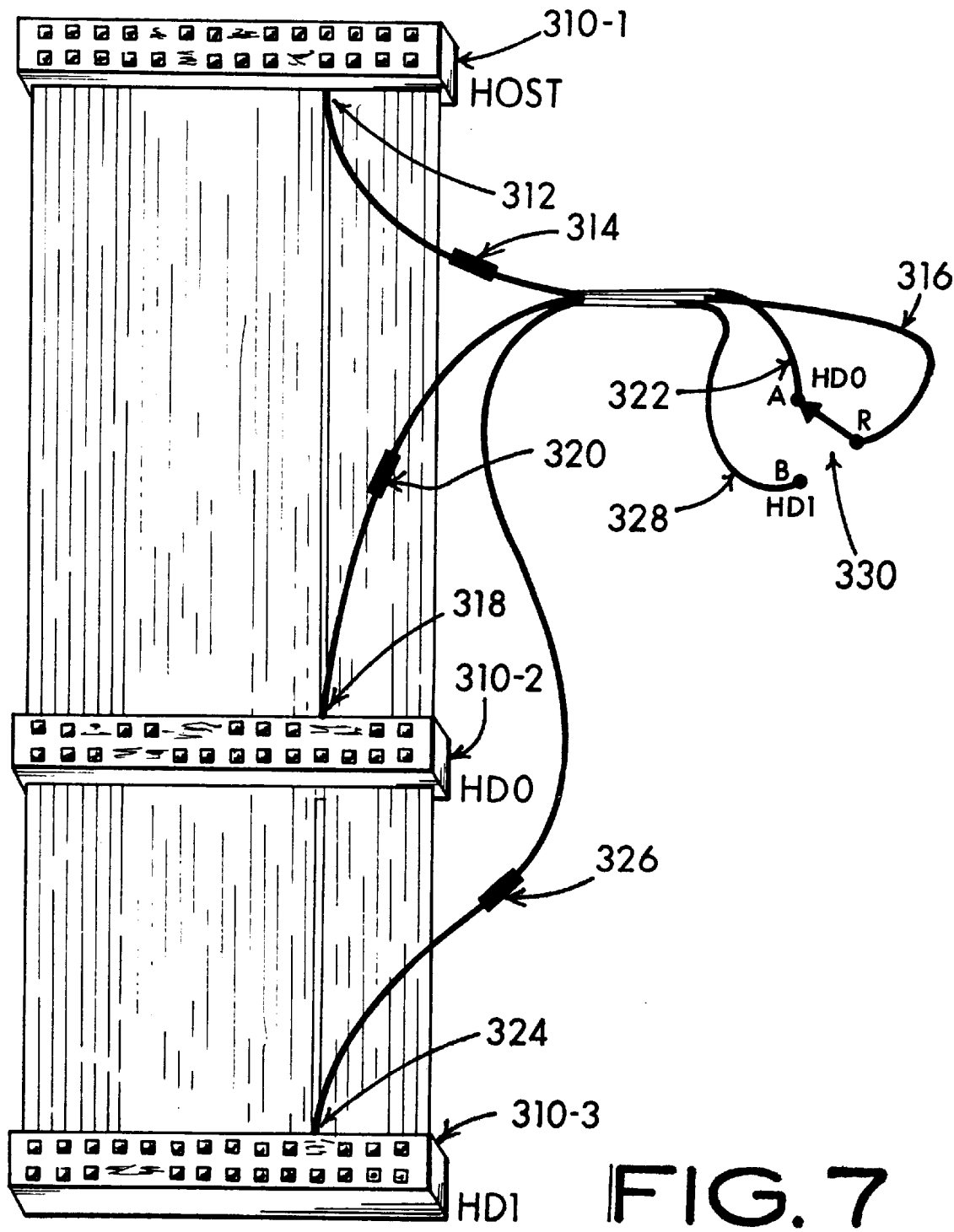

FIG. 7—Modification of an SCSI cable is shown together with a switch which may enable selection between one of two drives.

Figure 8:
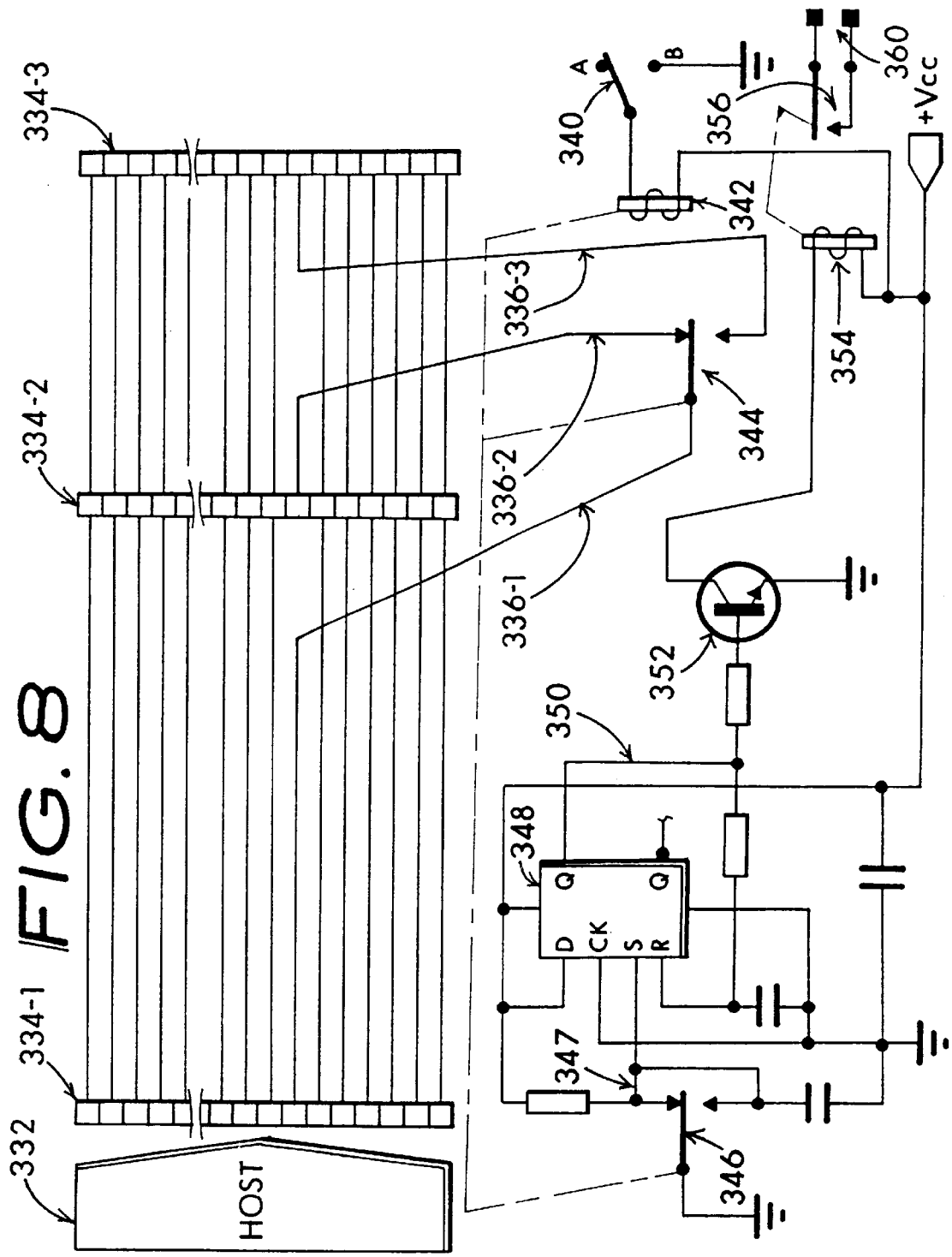

FIG. 8—Schematic representation of an SCSI cable like that shown in FIG. 7.

Figure 9:
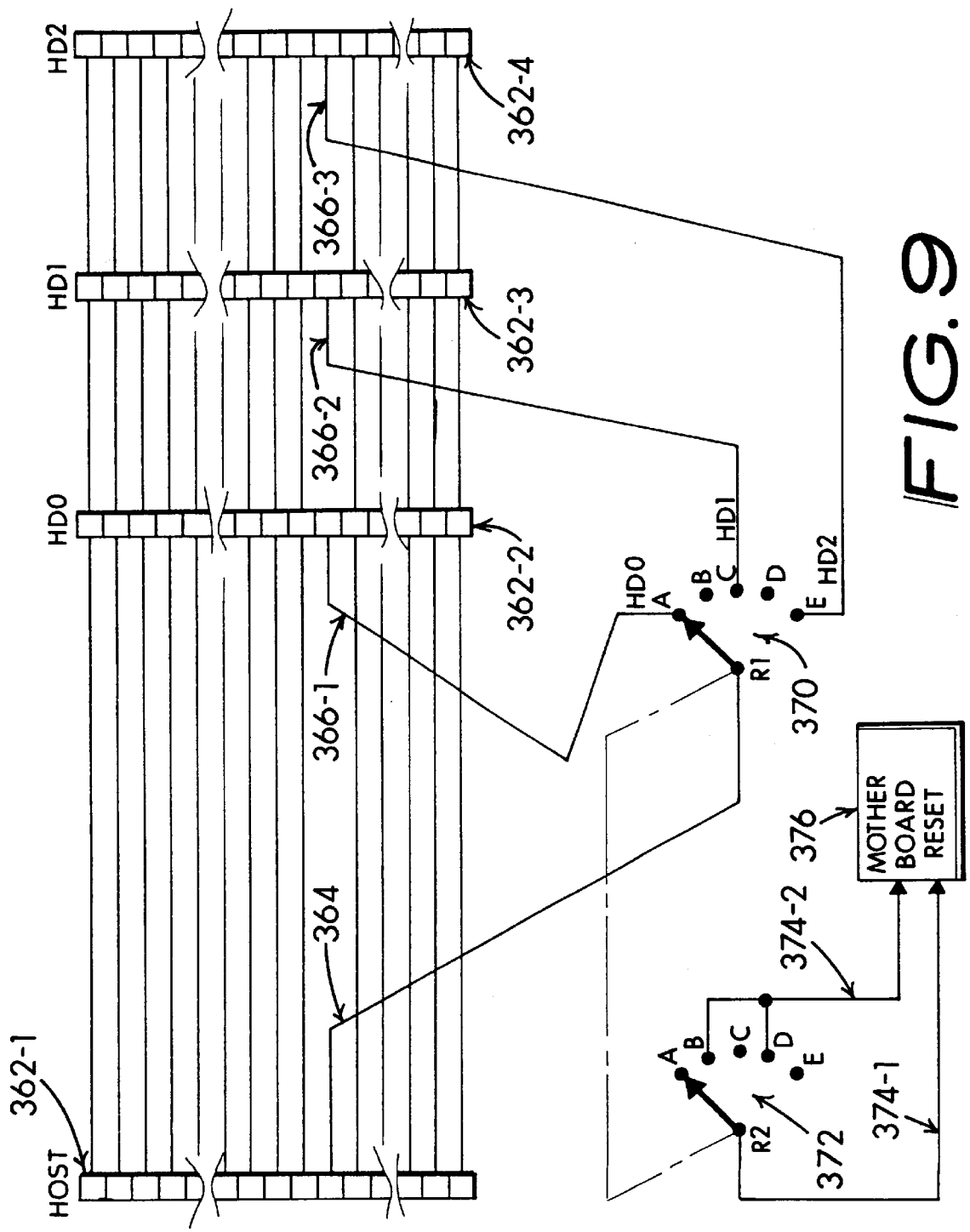

FIG. 9—Configuration where all SCSI drives are set to the same SCSI-ID and one out of three is selected active. When reselection occurs an automatic reset of the computer is also enacted FIG. 10—An SCSI configuration where physical drive 0 may remain active as logical drive 0 and physical drives 1,2 and 3 may be selected between as alternative logical drives 1.

Figure 11:
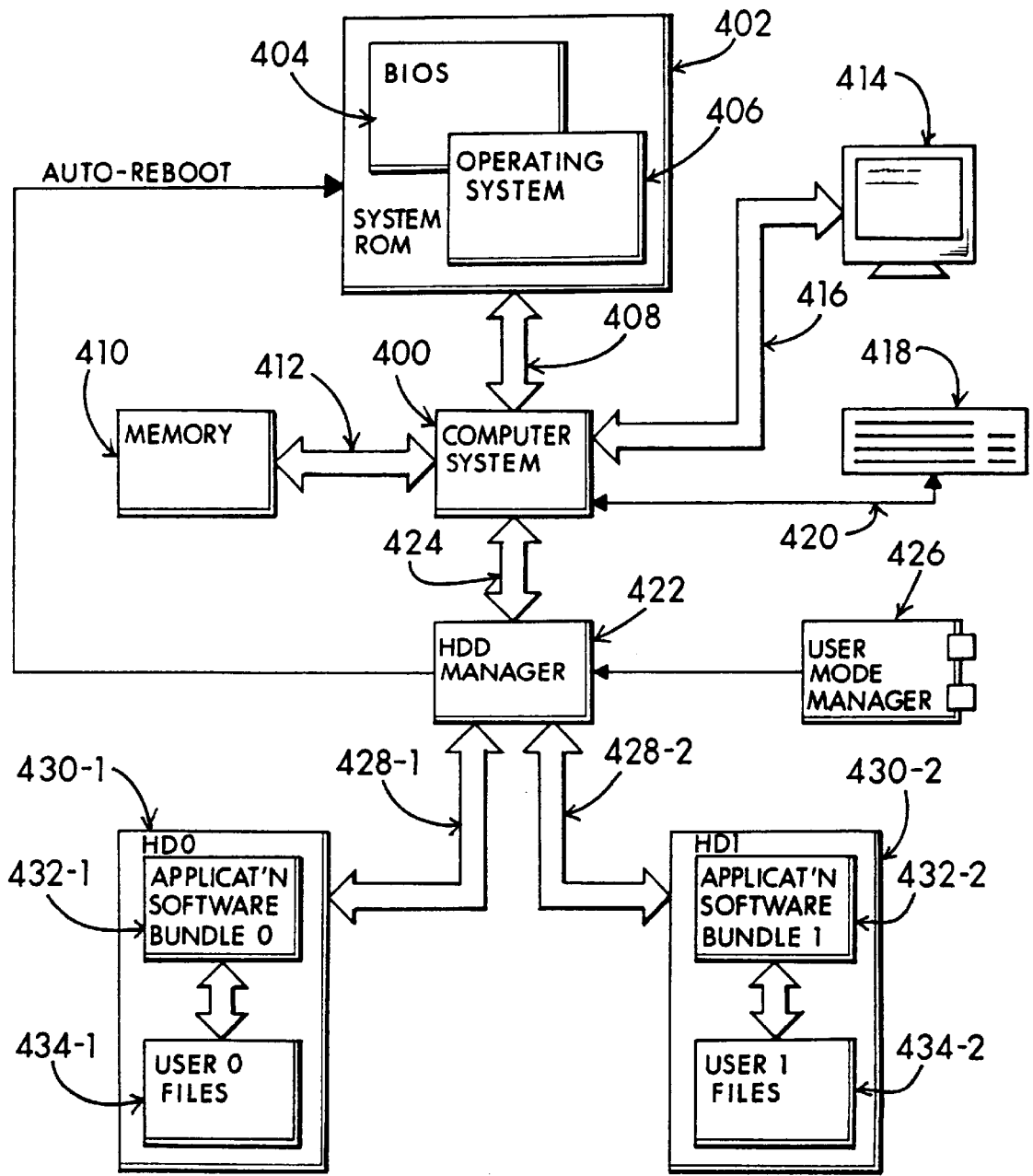

FIG. 11—Configuration of a computer having an operating system held in ROM which is equipped with my invention to select between at least two hard drives and software bundles.

Figure 12:
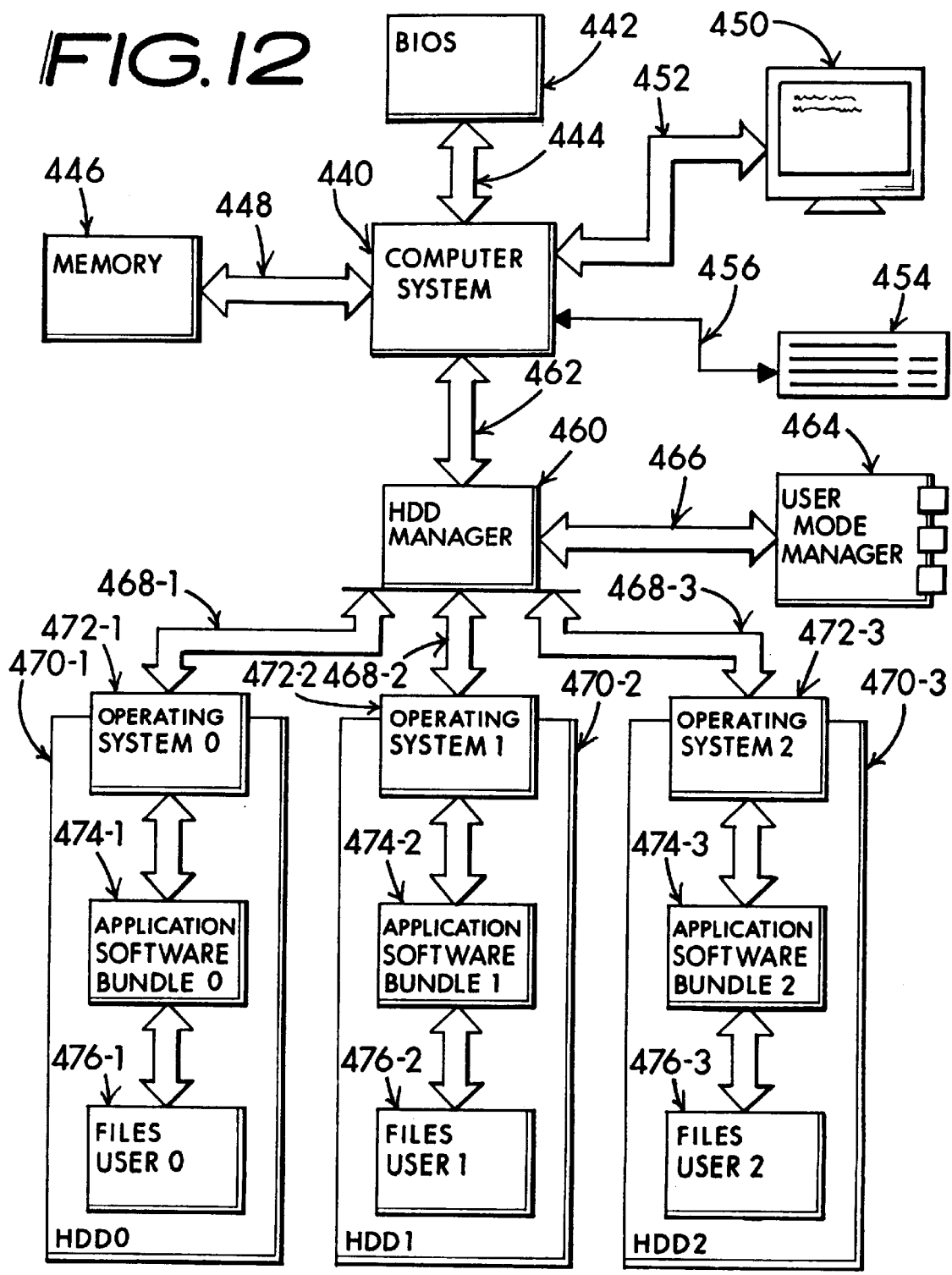

FIG. 12—Conventional computer system adapted to my invention for an empowered user's selection between one of several operating systems, software bundles and user files.

Figure 13:
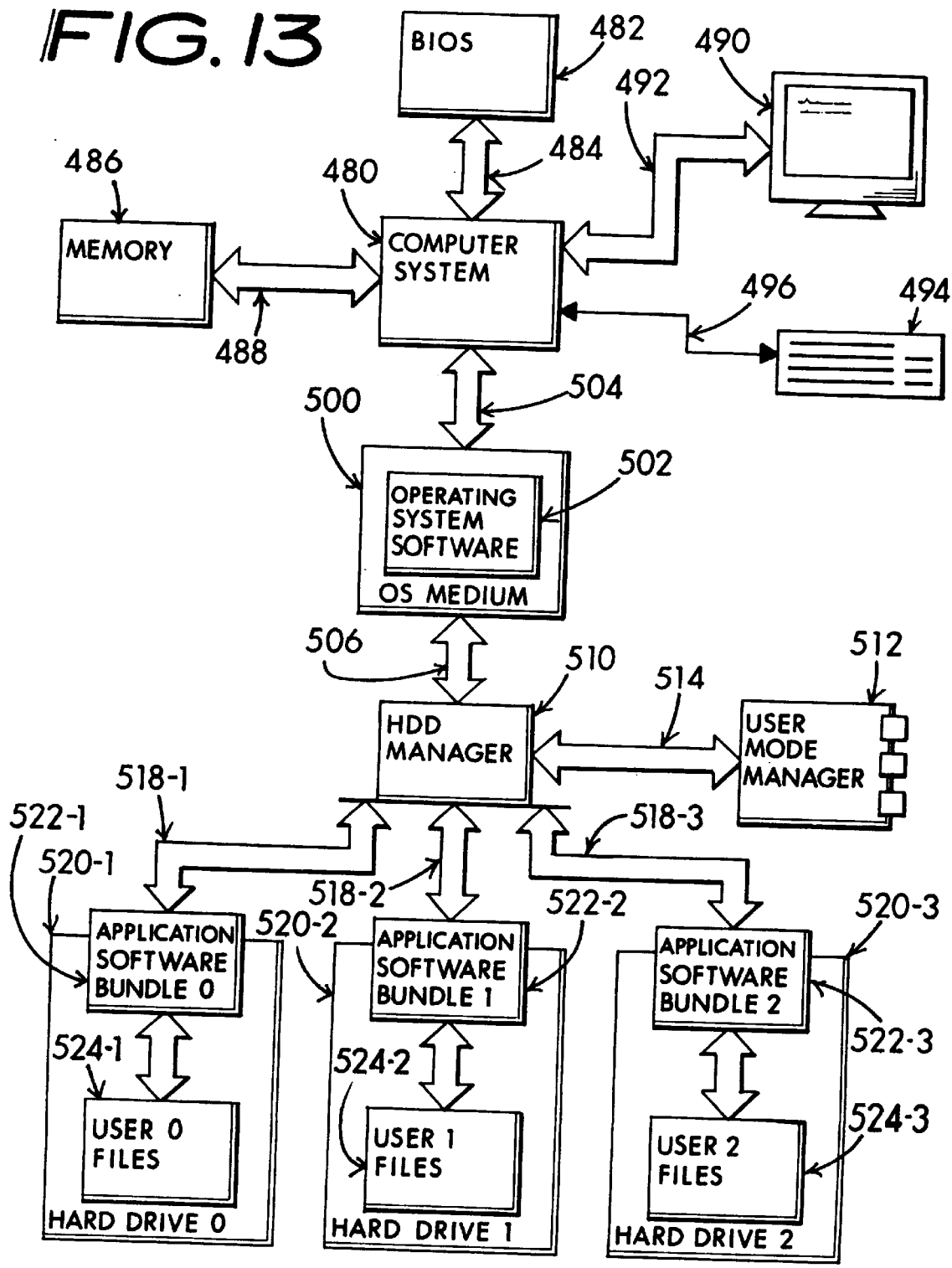

FIG. 13—Conventional computer system adpated to my invention for a shared operating system and an empowered user's selection between one of several software bundles and user files.

Figure 14:
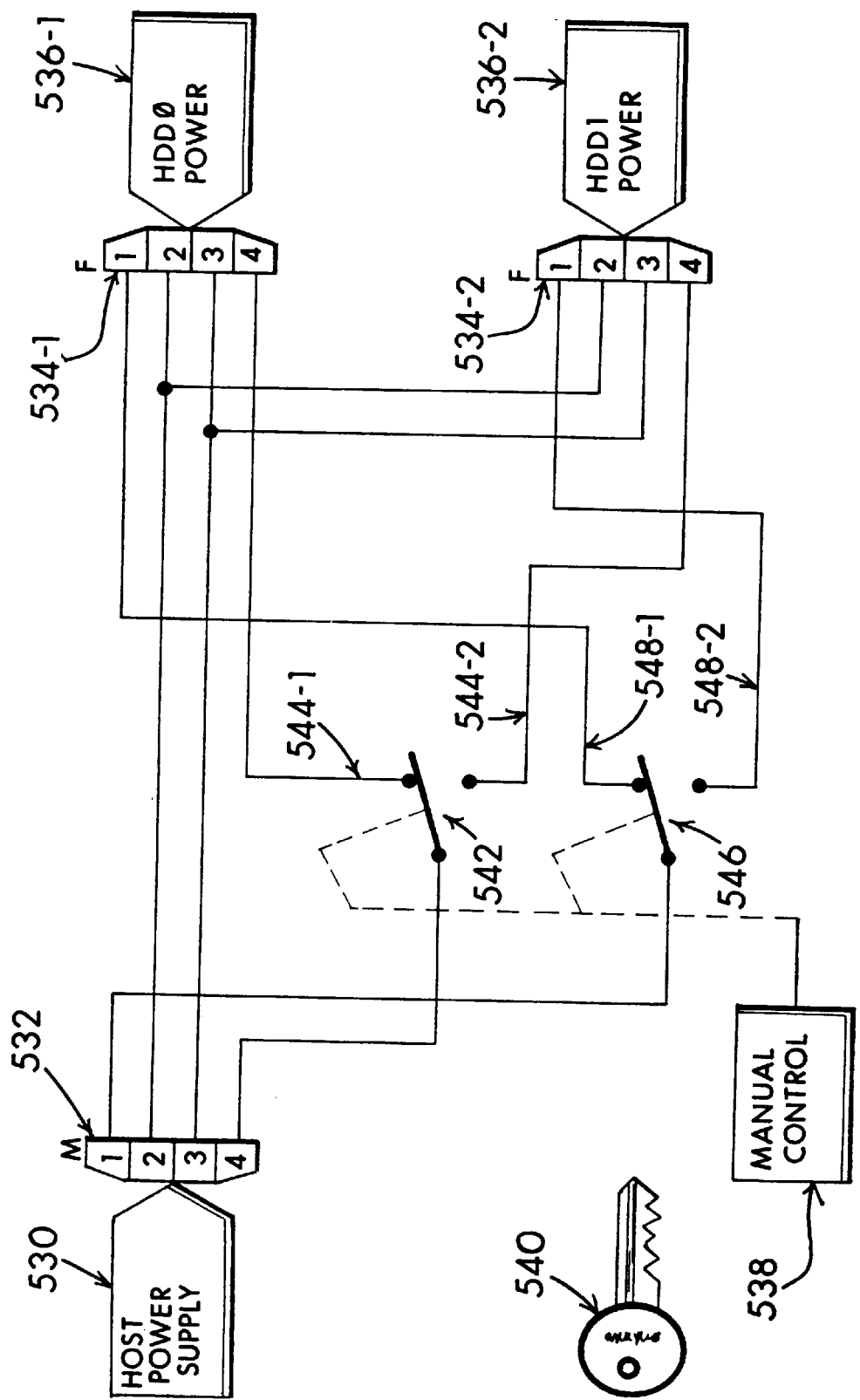

FIG. 14—Steering of hard disk drive DC power is obtained by a depicted circuit to include key-operated control.

DESCRIPTION OF MY INVENTION

In FIG. 1 I show an overview of a typical personal computer (hereinafter "PC") of the type which suits my invention's application. A microprocessor, CPU 10 couples with a memory 12-1 DRAM bank 0 and a memory 12-2 DRAM bank 1, bidirectionally coupled via a data bus 14 and address bus 16.

A ROM-BIOS 20 also couples with the CPU 10 and as is well known in the usual PC art, the ROM-BIOS includes self-test and setup instructions for starting-up the PC hardware. Also included is a DMA 22 and a timer 24, which may include a sounder 26 that ordinarily emits beeps indicative of boot-status.

The CPU also includes a bus 30 which interconnects a number of printed-circuit card edge connectors. These connector provisions are commonly referred to as "expansion slots". For example, a video adapter card 32 may plug-into one of the expansion slots, delivering processed video over a signal line 34 to a monitor 36.

I also show a keyboard interface 42 coupled 40 with the CPU 10 and a keyboard 44, used for making manual entries into the computer system.

The expansion bus 30 also supports a hard drive host adapter 50. The output of the host adapter is coupled 52 with a hard drive 54 and a hard drive 56. I also show my invention 60 to include a user interface 62, such as a switch or the like coupled with a hard drive selection manager 64 (viz hard disk drive selector). The hard drive selection manager is coupled with the two hard drives 0 and 1 to afford exclusive selection of one or the other.

Switching IDE Master/Slavedrive Jumpers

In a ubiquitous IDE/ATA or EIDE hard drive, a jumper arrangement is ordinarily provided which is set "open" or "closed" to determine that the drive is a "MASTER" or a "SLAVE". Assume for this discussion that an open jumper denotes a MASTER. The lines 66,68 are extended to the jumper connections and the hard drive selection manager has the job of alternatively jumpering one or the other of the drives, while the other is open. When the ROM-BIOS 20 is set to recognize only a MASTER drive (e.g., no slave present), whichever of the hard drive's 54 or 56 jumper setting appears open by the immediate setting of the hard drive selection manager 64 becomes the MASTER and subsequently the recognized system drive. In my invention, this selection is manually accomplished by an "upfront" intervention of the computer user as a layperson and not by "behind the scenes" settings established by technical setup personnel or a computer guru. As a result, either hard drive 0 or hard drive 1 is recognized depending upon the setting of the user interface 62. Conversely, the other unselected hard drive is not recognized by the system. The unrecognized hard drive can therefore not be written-to, over-written or otherwise corrupted.

With FIG. 2 I show an embodiment 70 for achieving the singular selection of any one of three separate hard drives by the user setting of a selection switch or the like. I depict a rotary switch 72-1 for example, having 5 switch positions. The mechanical indexing of the switch is configured to skip positions 2 and 4, with the indent stops occurring only in positions 1,3 or 5.

Prior to selection of HD0 on switch 72-1, the relay contact 78-1 is relaxed and in effect the lines 82-1,84-1 are "shorted together" by the relay contact 78-1 completion with line 79-1 as completed through the setup switch 80-1 closed contact connective with line 82-1. As a result, the IDE/ATA hard drive 86-1 appears to be jumpered and appear as a SLAVE which is ignored, as precedingly mentioned.

Now looking at the switch 72-1, the position 1 setting as shown couples the grounded switch rotor 72-1 with line 74-1, indicative of HD0 selection. The line 74-1, being grounded, completes a flow of current derived from a $V_{cc}$ source (typically +5VDC or +12VDC) through a relay coil 76-1 to the grounded line 74-1. As a result, the relay contacts 78-1 transfer to line 79-2. As a result, the connection between lines 82-1,84-1 is broken, appearing open (e.g., no jumper). As a result, the hard drive 86-1 appears as a MASTER and is selected by the ROM-BIOS recognition.

Changing the switch 72-1 to the position 3 setting instead couples the grounded switch rotor 72-1 with line 74-2, indicative of HD1 selection. The line 74-2 completes a flow of current derived from the $V_{cc}$ source through a relay coil 76-2 to the grounded line 74-2. As a result, the relay contacts 78-2 transfer to line 79-4. As a result, the connection between lines 82-2,84-2 is broken, appearing open. As a result, the hard drive 86-2 appears as a MASTER and is selected by the ROM-BIOS recognition.

Further changing the switch 72-1 to the position 5 setting instead couples the grounded switch rotor 72-1 with line 74-3, indicative of HD2 selection. The line 74-3 completes a flow of current derived from the $V_{cc}$ source through a relay coil 76-3 to the grounded line 74-3. As a result, the relay contacts 78-3 transfer to line 79-6. As a result, the connection between lines 82-3,84-3 is broken, appearing open. As a result, the hard drive 86-3 appears as a MASTER and is selected by the ROM-BIOS recognition.

A switch 72-2 coupled with the switch 72-1 correspondingly steps through the three disk-selection positions 1,3 and 5. As shown intermediate positions 2 and 4 are also included. One of the special aspects of an index or positioning device associated with the switch sections 72-1,72-2 is that the detent stops are sited at positions 1,3,5 with the rotor 72-1 "just passing through" the positions 2 and 4. As switch section 72-2 depicts, connections are made to positions 2 and 4 relative with the rotor. What occurs is that, as the rotor of the switch section 72-2 sweeps through the positions 2 and 4 on its passage between positions 1 and and positions 3 and 5, briefly "shorting" the lines 88-1,88-2 which couple with a system-reset connection of a typical PC motherboard. As a result, any change of hard drive selection ordered by the switch sections 72-1,72-2 is automatically accomplished by a full system reset and re-configuration of the selected hard drive.

Moving to FIG. 3, I show three functionally separable hard drives 120-1,120-2,120-3. What makes this depiction important is the inclusion of three different bundles of software 100-1,100-2,100-3 available to any one or more of three different classes of users.

Bundle 100-1 for example is applicable to the needs of a USER A 102-1. The USER A utilizes a set of application programs and associated files 104-1 which are ordinarily prepared in a high-level language 106-1 typically prepared in C, C+, Pascal or some other suitable language. The high-level language of the applications program is ordinarily utilized in conjunction with a shell program, such as Microsoft's Windows-95, which usually includes a version of MS-DOS 7 or the like.

Another software bundle 100-2 is configured applicable to the needs of a USER B 102-2. The USER B utilizes a set of application programs and associated files 104-2 which are ordinarily prepared in a high-level language 106-2. The high-level language of the applications program is similarly utilized in conjunction with a shell program, such as Microsoft's "oldy-but-goody" DOSSHELL, which usually includes a version of MS-DOS 3.3 or later, such as the shown MS-DOS 5.0.

Still another software bundle 100-3 is configured applicable to the needs of a USER C 102-3. The USER C utilizes a set of application programs and associated files 104-3 which are ordinarily prepared in the high-level language 106-3. As mentioned, the high-level language of the applications program is similarly utilized in conjunction with a shell program, such as Microsoft's Windows-3.11, which usually includes a version of MS-DOS 5 or later, such as the shown MS-DOS 6.2.

Look now that a computer system 122 is the underpinning of this arrangement. The computer system 122 typically includes a monitor and keyboard (not shown) for user interface. The computer system 122 is initialized by a ROM-BIOS 124 coupled 126 with the system 122.

The computer system 122 also provides a data bus 128 coupled with a hard drive host adapter 130. Typically, this host adapter is either plugged-into one of the motherboard's expansion slots or included with the layout of the motherboard. As I show each hard disk drive 120-1,120-2,120-3 couples 132 with the host adapter 130 in accord with well known practice.

My invention typically provides a user mode manager 140 which may include a selection device such as a rotary switch or pushbutton switch, for example that include user selectable positions 1,2 and 3 as a part of the mode manager 140.

The mode manager 140 couples 144 with a hard disk drive selector 142. In a fundamental practice of my invention, each line 146-1,146-2 and 146-3 runs to a MASTER/SLAVE "jumper" connection on each of the three hard drives 120-1,120-2,120-3.

To practice my invention as taught in the FIG. 3, the ROM-BIOS is preset to recognize only a MASTER drive and ignore any SLAVE drive. This is of course determined by the HDD selector 142 levels found on lines 146-1,146-2,146-3. As a result, a single user or three different users may select any one of the three available software bundles 100-1,100-2,100-3 for dedicated user access. Cross corruption to other drives, which appear as slave drives is absolutely denied.

With FIG. 4 I depict a typical PC utilizing an Intel 80x86 microprocessor 150, such as an 80486 or a Pentium class. This is well known art, having been the underpinnings of computer architecture in one form or another since about 1982 and more particularly with the introduction of the IBM-AT class machines. Many variations in embodiment are well known, having been implemented by scores of computer makers. Also, the microprocessor 150 may be an equivalent device produced by AMD, Cyrix, DEC and others.

The usual microprocessor 150 includes a usually internal math co-processor 152. A signal bus 154 couples the microprocessor 150 with a set of system memory dram. Current technology permits for memory sizes ranging between about 16 MB and 128 MB or more. A system ROM containing proprietary BIOS software 158 usually tailored to each motherboard layout is used to bootstrap the computer hardware through self-test routines, establish interface configurations, and ultimately tie the hardware system and an operating system together to bring life to the system. A real time clock 160 together with a CMOS memory includes provision for storing setup data when the system power is off.

Another bus 164 couples with a keyboard interface 162 having circuitry suited for communicating with a user's keyboard 166.

Yet another bus 172 may intercouple with a video display adapter 170, delivering video signals 174 to a monitor 176 for viewing by the user. A video ROM-BIOS 178 is typically included as part of the video display adapter 170 to meet the requirements for holding screens of video data.

I also show a power supply 180 which typically provides +5 volts DC, ±12 volts DC and any other operating needs of the system.

Another bus 186 permits interface between the computer and external peripherals. For example a parallel interface affording "LPT" ports 182 and a serial interface 184 with RS-232C or equivalent signal interface is provided to cope with the computer's "COM" ports. Realize that it is not unusual that one of the serial COM ports is used as an interface with a "mouse" for user input.

A data bus 190 is provided for mass memory data interface with the microprocessor. Mass memory may include a floppy disk drive controller 192 coupled with at least one floppy disk drive 194-1 and frequently with a second floppy disk drive 194-2 for enabling a user to load software programs and store portable files. In a typical computer of this sort the FDD0 device 194-1 is usually a 3½" drive having 1.44 MB capacity and designated as logical drive A. A second FDD1 device 194-2, if included, is usually a 5¼" drive with 1.2 MB capacity and designated as logical drive B.

A hard disk drive 196 (hereinafter HDD), including a supplementary ROM-BIOS 198 which supplements the main system ROM-BIOS 158 is included in most contemporaneous host adapters 196.

Multiple Non-Concurrent Disk Drives

Departure from the usual configuration for this sort of computer occurs as a result of my invention by including an IDE/ATA signal bus 202 which intercouples with three hard disk drives 200-1,200-2,200-3.

A user interface mode manager 210 includes a user accessible interface for selecting any 1 of 3 configurations (shown by the "buttons" 1,2,3 on the mode manager 210). The selection is coupled 214 with a user HDD selector. In practice the selector 212 may couple 216 via the control lines 218-1,218-2,218-3 with each of the three HDD devices 200-1,200-2,200-3.

The system ROM-BIOS 158 is set, during initial setup configuration of a computer which includes my invention, to recognize only a MASTER HDD and to ignore any SLAVE HDD. The signals on the lines 218-1,218-2,218-3 are established to produce a "jumper" configuration in each of the HDD devices whereby one and only one is recognized as a MASTER and the other two appear as SLAVES. The choice of which one is the MASTER is variously served by the user HDD selector 212 to comply with which user mode manager 210 selection has been made.

As a result, any one of the three HDD devices may be made active while the other two are dormant. The operational worth of this is that the immediate operator activities are limited only to the active HDD while the dormant drives are inaccessible via software and therefore immune to data corruption irrespective of what activity occurs on the active drive.

Flow Chart of Drive Selection

A flow-chart given in FIG. 5 is useful for defining how each user-related hard drive is exclusively selected, using a mutually exclusive one-of-three selection. With system power-on 220 a user may set a manual mode selector 222 to the desired user mode, which in this example is a choice between user-modes 1,2 and 3. A "change mode selection?" decisional logic function, (which I hereinafter call a "decisor") 224 implements two possible responses. A NO returns to the mode selector 222 whilst a YES couples with the system reset 226, which amongst its various functions, re-boots the computer system. Noteworthy also is that a line 232 also sends a "power on" signal which initially boots the system. Additionally, a manual system reset 234 couples with the system reset 230 allowing a user to manually re-boot the system at will. The instant value for a user determined mode-choice (e.g., 1,2 or 3) developed by activity associated with the manual mode selector 222 is furthermore coupled through the decisor 224 and the reset function 230 to appear on line 238 as coupled with a ROM-BIOS setup function 240 (or at least with the logic associated with the ROM-BIOS device). In effect, this allows for setup of the computers most elemental functions, such as input/output port determinations, video parameters, keyboard factors, floppy-disk settings and most important for my invention, hard-disk drive settings.

Set ROM-BIOS for One Drive Response

While one drive operation is not necessarily a limitation on my invention, for I intend to show multiple drive operation, you will recognize that this is a good starting point for my invention's illustration. Therefore, the ROM-BIOS is set, during BIOS-setup, to recognize only a MASTER or a DRIVE $\emptyset$ hard drive, while ignoring any SLAVE or DRIVE 1,2, . . . etc. drive.

Another salient, but substantial, advantage of my invention when utilizing one-drive ROM-BIOS setup appears in IDE/ATA interfaces. As is well known, IDE/ATA interface permits only two concurrently-operative drives. With my arrangement, you can achieve a choice between many non-concurrently operative drives, each of which may support a different user, a different set of software, or an extremely different operating system.

The user determined mode choice carries through and is submitted to a "select mode 2?" decisor function 242. A mode 2 selection yields a YES on line 244, which concurrently couples with an ENable input of an enable drive 2 function 250-1, and the DISable inputs of the other two enable drive $\emptyset$ and enable drive 1 functions 250-2,250-3.

The enablement 250-1 of drive 2 introduces a boot software bundle 2, which is ordinarily what is called the operating system or at least an initial part of the operating system software, such as Microsoft's Windows-95, for example. Subsequently, the run software bundle 2 (ordinarily applications software and user files) 254-1 is made available to a "third user" 256-1.

Realize that each user may be a different person or conversely each user may be the same person acting as virtual users desiring to run disparate computer programs or operating systems.

For illustration, manual mode selection, hard drive designation and user designation are translated as:

| MANUAL MODE SELECTION | HARD DRIVE № | USER № |
|---|---|---|
| $\emptyset$ or A | $\emptyset$ | First |
| 1 or B | 1 | Second |
| 2 or C | 2 | Third |

When the manual mode selector 222 entry is a 1, the decisor 242 delivers a NO signal on line 246 to another "select mode 1?" decisor 260. Recognition of the manually entered mode 1 selection, a YES is delivered on line 262 which couples with the ENable input of an enable drive 1 function 250-2 and concurrently with the DISable inputs of the other two functions 250-1,250-3.

Enablement of function 250-2 allows a different bundle 1 of software 252-2 to be submitted to the computer system. This second bundle may include an identical operating system to that introduced by the software bundle 2, or it may be extraordinarily incompatible with that of the software bundle 1. Such an example may be achieved where software bundle 2 is the mentioned Windows-95 whilst the software bundle 1 is an UNIX or LINUX operating system. Subsequently, the run software 254-2 bundle 1 is submitted to the computer and subsequently interfaced with a "second user" 256-2.

When the manual mode selector 222 entry is a $\emptyset$, the decisor 260 delivers a NO signal on line 264 to an ENable input of an enable drive $\emptyset$ function 250-3 and concurrently with the DISable inputs of the other two functions 250-1, 250-2.

A resulting enablement of function 250-3 allows a different bundle $\emptyset$ of software 252-3 to be submitted to the computer system. As before this third bundle 252-3 may include an identical operating system to that introduced by the software bundles 1 and 2, or it may be extraordinarily incompatible with that of the software bundles 1 or 2. Subsequently, the run software 254-3 bundle $\emptyset$ is submitted to the computer and subsequently interfaced with a "first user" 256-3. Any competent artisan will conclude that this arrangement lends itself to selection of one of any two or more hard disk drives and their respective contents at the absolute exclusion of the unselected hard drives.

"Scuzzy" Hard-Drive Interface

With FIG. 6 I suggest "how" my invention is interfaced with an SCSI interface bus. As is well known, the classic SCSI bus 270 supports a host and seven devices, which in this case we are discussing hard disk drive devices 278-1, 278-2,278-3 which are linked 276-1,276-2,276-3 to the SCSI bus 270 as the subject devices.

Two SCSI bus embodiments are in commonplace usage. One is based on a 50-conductor "A-cable" and connector configuration; the other sometime known as "wide scuzzy" is based on a 68-conductor "P-cable" and connector configuration. My invention is amenable to either form of cabling practice.

With the usual 50-conductor SCSI cable, a /SEL control signal is routed over line 47. Comparatively, with the 68-conductor SCSI cable the /SEL control signal is routed over line 61.

For discussion, I am limiting myself to the 50-pin configuration with the unequivocal understanding that insofar as my invention is concerned, the 68-pin configuration utilizes the same approach, except for specific /SEL pin assignment as mentioned above.

On the SCSI bus 270 depicted in FIG. 6, terminal 47 signal lines are broken-out 272-1,272-2,272-3 and not routed to the hard drives 278-1,278-2,278-3 as usual practice dictates. Furthermore, with intentional violation of conventional wisdom, each (e.g., all) of the hard drives 278-1,278-2,278-3 are set to the same SCSI-ID number setting. Ordinarily, this is the SCSI-ID no. $\emptyset$ in order to make each of the drives appear as a non-concurrent logical drive C.

The lines 272-1,272-2,272-3 each couple with a normally-open relay contact set 284-1,284-2,284-3. In turn these contact sets couple via lines 284-1,284-2,284-3 to each of the hard drives 278-1,278-2,278-3.

User interface is provided by a switch 280 which may enable a user to select between contact A,B or C. It is urgent for you to realize that this switch must be a break-before-make configuration in this example. As a result the instant level on line 292 may bounce HIGH between switch contact selections when the rotor is intermediate between the contacts. Otherwise, the grounded state of one of lines 286-1, 286-2,286-3 is draws the line 292 LOW via one of the steering diodes 290-1,290-2,290-3.

When the switch 280 is set to contact A, the relay coil is energized as it returns to the +V$_{cc}$ d.c. power line.

Activating the relay 282-1 closes the contact set 284-1 resulting in a steering of the SCSI bus line 272-1 via the line 274-1 to the hard drive 0. As a result the hard drive 278-1 is selected active and the remaining drives 278-2,278-3 are denied access by the system.

Similarly moving the switch 280 arm to contact B of switch 200 the relay 282-2 is energized closing contact set 284-2 resulting in a steering of the SCSI bus line 272-2 via the line 274-2 to the hard drive 1. As a result the hard drive 278-2 is selected active and the remaining drives 278-1, 278-3 are denied access by the system.

By further moving the user manipulated switch arm to contact C of switch 200 relay 282-3 is energized closing contact set 284-3 resulting in a steering of the SCSI bus line 272-3 via the line 274-3 to the hard drive 2. As a result the hard drive 278-3 is selected active and the remaining drives 278-1,278-2 are denied access by the system.

You will see where this selection of only one drive and disabling the others gives full access to one drive's set of software, including a unique operating system setup, while absolutely denying access to any other drive. As a result the "other users" drives remain ineffaceable and therefore their files remain uncorrupted.

To further assure protection of other user's drives, the HIGH level momentarily developed on line 292 between switch selections delivers a Trigger pulse to a monostable multivibrator built around two NOR gates 296-1,296-2 (such as type CD4001BE i.c. device) which produces a short duration HIGH level pulse signal on line 300, as coupled with an NPN transistor 302. A capacitor 298-1 and resistor 298-2 serve as timing elements, establishing about a 0.5 to 5 second duration pulse on the line 300.

Transistor 302 is briefly driven conductive thereby activating a relay coil 304 which closes the contact set. Ordinarily, these contacts are bridged across 308 a motherboard's usual reset or RST terminals. The result is a user is unable to switch between hard drive selections without automatically resetting the system with its new configuration data.

With FIG. 7 I illustrate a physical embodiment for this approach of drive selection, which is shown to be able to choose between an HD0 device coupled with connector 310-2 and an HD1 device coupled with connector 310-3. In this arrangement, an SCSI HOST adapter is coupled with the connector 310-1. With an SCSI A-cable, the lead 47 is diverted 312 from the usual ribbon cable and coupled with a signal line 316 utilizing a crimp-on or solder-on extension technique 314.

Line 316 couples with a rotor R of a switch 330. A user may actuate the switch 330 where the rotor selects position A for the HD0 as shown. As a result the signal derived from the breakout 312 is coupled via line 322 and connection 320 to pin 47 of the 50-pin connector 310-2. The singular result is exclusive enablement of the attached (not shown) hard drive HD0.

By moving the rotor of the switch 339 to position B, the signals pass via lines 328 and connection 326 to an exclusive juncture 324 with terminal 47 of the connector 310-3 singularly resulting is exclusive enablement of an attached (not shown) hard drive HD1.

FIG. 8 is a schematic configuration for obtaining control of two SCSI hard drives on a "one or the other" basis. An SCSI host adapter 332 couples with the SCSI host connector 334-1. A HD0 couples with a connector 334-2 and a HD1 couples with a connector 334-3.

Observe that the /SEL line 336-1, terminal 47 on the connector 334-1, is diverted to the arm of a set of relay contacts 344. In the relays "relaxed" state the /SEL signal flows through the contacts via line 336-2 to terminal 47 on the HD0 connector 334-2. As a result, the HD0 drive is singularly operative and the HD1 drive is absolutely ignored.

Resetting a user's selection switch 340 to from its initial position A to position B energizes the relay coil 342 through the +V$_{cc}$ d.c. power line. The result is the contact set 344 is switched, coupling the /SEL line 336-1 with terminal 47 of the HD1 drive connector 334-3. As a result, the HD1 becomes the active drive at the absolute exclusion of the HD0 drive. As said before, in order to make both these drives electable as logical drive C devices, their SCSI-ID is set to the same value and usually 0.

When the switch 340 is "switched-over" another set of contacts 346 is also switched introducing a HIGH signal state via line 347 to the SET input of a flip-flop 348. The contacts 346 must be break-before-make, thereby pulling the juncture 348 briefly high when the ground is momentarily broken. An associated capacitor is typically about 47-pf and is optional.

The flip-flop operates as a one-shot delivering a HIGH state pulse signal on line 350 having a duration between about 0.5 and 5 seconds to an NPN transistor. As depicted, the transistor 352 turns on briefly, energizing the relay coil 354 and closing the contact set 356 which is coupled 360 to the computer's usual RESET circuitry.

A variation on multiple SCSI drive selection is illustrated by my FIG. 9. An SCSI host connector 362-1 couples with the SCSI bus and companion connectors 362-2 for a HD0 drive, 362-3 for a HD1 drive and 362-4 for a HD2 drive.

A terminal 47/SEL signal line 364 is routed from the connector 362-1 to a rotor R1 of a user-settable switch 370. In the shown setting the switch routes the line 364 signals via line 366-1 to terminal 47 of the HD0 drive connector, thereby singularly enabling the HD0 drive.

Special Switch Characteristics

The rotary switch 370 is said to have a special characteristic. Specifically, it has a set of contacts A–E with a n° spacing between adjacent contact. Meanwhile the rotor's step-wise movement is provided with a 2n° index spacing. For example, the contacts A–E may be arranged on 15° centers, while the switch mechanically indexes through 30° steps. What this literally means is that the switch indexes between positions A,C and E whilst the rotor "sweeps through" but does not ordinarily stop on positions B and D.

When the switch is indexed to position C, the signal line 364 couples with line 366-2 that junctures with terminal 47 of the connector 362-3, affording singular operability of the HD1 drive. Similarly, indexing the switch 370 to position E a coupling of the signal line 364 with line 366-3 that junctures with terminal 47 of the connector 362-4 assures singular operability of the HD2 drive.

Same SCSI-IDs Overcomes Cabling Error

While I violate conventional wisdom and set all three drives to the same SCSI-ID number 0, for example, this approach permits selection of any one of the mentioned three drives as the logical drive C. It also assures that an error in cabling of the three drives, e.g. using an ordinary cable and not the illustrated configuration, simply causes the entire system to crash requiring that the proper hook-up be installed. As a result, data is unlikely to be reached and corrupted on any one of the drives by the cabling error.

Looking now at switch 372, recall that the rotor R2 "sweeps through" positions B and D. As a result they are momentarily closed, thereby shunting the lines 374-1,374-2 which may be utilized to reset the motherboard 376 whenever the selections are changed.

Common Drive-C With Drives-D "Choice"

It is not at all uncommon for several workers to share one computer system in the workplace. This is similar to a home office sharing with personal applications. Frequently a common operating system such as Windows-NT or Windows-95 together with a common set of application programs can satisfy the needs of all the users negating any need for operating system or applications program duplicity.

Figure 10:
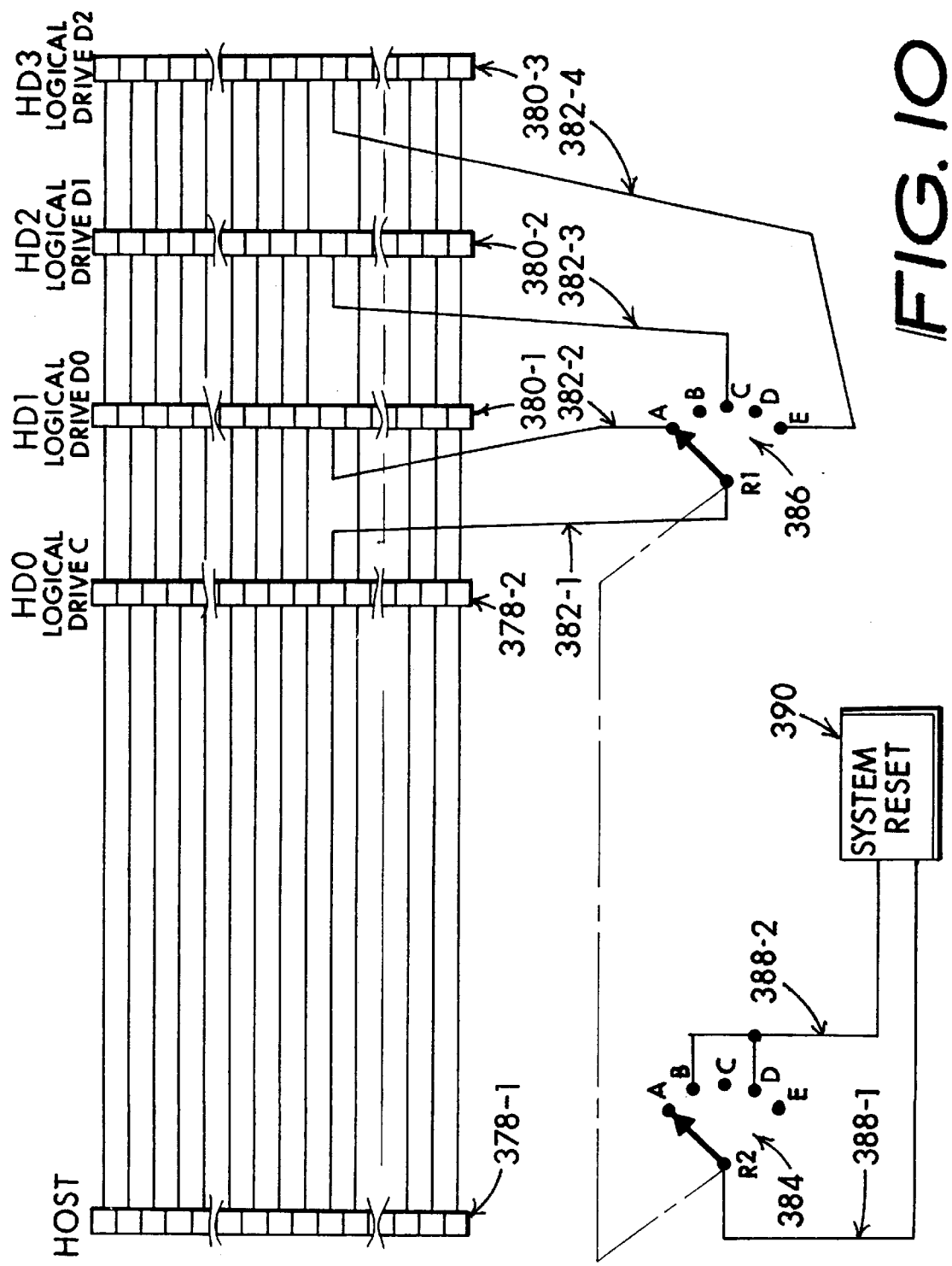

In my FIG. 10 each worker does normally maintain his or her own distinct set of files on one of the three attached hard drives D0,D1 or D2. The worst scenario is for one worker to inadvertently corrupt another's files. More commonly though is the privacy requirement, where one worker may accidentally or intentionally access another worker's files.

In my FIG. 10 I overcome this issue with absolute authority. That is the files of one worker are isolated from other users. I realize that most software includes some sort of password or other safeguard, but this does no good whatsover to protect a worker's files from corruption such as deletion by another worker.

It also does not protect worker's against stupid or intentional gross-errors such as reformatting the hard drive, which loses everything.

With my invention's hookup of FIG. 10, erroneous or intentional reformatting will normally damage only the HD0 contents and maybe the contents of the other hard drives usually employed by the subject worker. The other worker's files are, however, absolutely safe since the associated drives are essentially disabled.

As shown, a user settable switch 384 may select either position A,C or E as earlier described for FIG. 9. An SCSI connector 378-1 couples with an SCSI host adapter (not shown). The SCSI bus also fully couples with the HD0 drive SCSI connector 378-2. As a result of this, the HD0 drive is always operative and ordinarily is loaded with an operating system and usually with applications software. This drive's SCSI-ID must be set to 0 to function as a virtual drive C.

The remaining several hard drives HD1,HD2,HD3 have their SCSI-ID values set to a same value 1 thereby collectively establishing them as logical drives "D". In my illustration they are denoted as (unshown) drives D0,D1 and D2.

Using a switch 386, a user may select position A,C or E while "sweeping through" positions B and D. When the rotor R1 is directed to position A, the /SEL signal on line 382-1 as obtained from terminal 47 of the connector 378-2 is directed to terminal 47 of a connector 380-1 thereby enabling the logical drive D0 as the only "D" designated (or SCSI-ID 1) drive which is active.

Similarly, moving the switch 386 rotor R1 to position C couples with line 382-3 and terminal 47 of the logical drive D1 connector 380-2.

When the switch 384 rotor R1 is moved to position E, the lines 382-1 and 382-4 are joined therefrom coupling with the terminal 47 of the logical drive D2 connector 380-3.

When the switch section 386 is conjunctively moved between positions A,C and E the rotor sweeps-across contacts B and D momentarily shunting lines 388-1,388-2 coupled with the system reset 390 lines.

In FIG. 11 I depict a computer system 400 architecture in which a BIOS 404 and an operating system 406 reside in one or more system ROM devices 402. The ROM device 402 couples 408 with the computer system. In this sort of embodiment, which typifies Apple Computer's approach, the ROM 402 and the computer system 400 are generally inseparable. I also show a memory 410 coupled 412 with the computer system.

A video monitor 414 couples with the computer system which includes an integrated video driver. Also shown is a keyboard 418 attached by a cord 420 to the computer system.

I show a hard disk drive manager 422 coupled 424 with the computer system. Also provided is a user mode manager which, in this depiction, enables a user to select between two drive choices.

When the user selects 1 on the mode manager 426, the HDD manager enables the signal bus 428-1 coupled with a hard drive 0 430-1. The hard drive is utilized primarily to hold an applications software bundle 0 432-1 and the user 0 files 434-1. Any access to the other hard drive 1 is absolutely denied in this mode, making the contents of the drive 1 secure against corruption by activities undertaken relative with the drive 0.

On the other hand, if the user selects 2 on the mode manager 426, the HDD manager enables the signal bus 428-2 coupled with the hard drive 1 430-2. This hard drive is utilized primarily to hod an applications software bundle 1 432-2 and the user 1 files 434-2. Any access to the other hard drive 0 is absolutely denied in this mode, making the contents of the drive 0 secure against corruption by activities undertaken relative with the drive 1.

With FIG. 12 a computer system or PC 440 is depicted to include a BIOS 442 coupled 444 with the system 440. This embodiment is similar to a PC and includes a DRAM memory 446 coupled 448 with the system 440. I also show a monitor 450 for user viewing coupled 452 to the system. A keyboard 454 interfaces 456 with the system to permit user entries.

Most central to my invention is a hard disk drive manager 460 coupled with the system 440. A user mode manager 464 gives a choice of three HDD modes, usually one for each of three different users or three different operating systems.

When the user mode manager selection is a 1 it is coupled 466 with the HDD manager which then enables signal bus 468-1 while absolutely disabling signal buses 468-2,468-3. This enablement or disablement is generally accomplished in one of two ways in my invention's practice. One is by interrupting signal lines to hard drives 470-1,470-2,470-3 coupled with the buses 468-2,468-3, such as the earlier mentioned /SEL line in a SCSI bus configuration.

When the hard drive 0 470-1 is selected active, the other two hard drives are absolutely locked-out from the user of the drive 0. As shown, the drive 0 is loaded with an operating system 0 472-1, an applications software bundle 0 474-1 and user 0 files. Other selections on the user mode manager 464 serve to direct the HDD manager 460 to exclusively activate hard drive 1 or hard drive 2.

| USER MODE MANAGER SELECTION | HARD DISK DRIVE SELECTION | USER No. |
|---|---|---|
| 1 | 470-1 | 0 |
| 2 | 470-2 | 1 |
| 3 | 470-3 | 2 |

In a similar way, as the chart denotes, a user mode manager 464 selection of 2 or 3 exclusively activates hard drive 470-2 or 470-3. Each hard drive 470-2 and 470-3 carry different operating system 472-2,472-3 configurations and application software bundles 474-2,474-3 together withh individual user files 476-2,476-3.

With FIG. 13 I show a computer system 480, including a ROM-BIOS 482 coupled therewith 484. This showing is in the general configuration of a PC and includes a memory 486 coupled 488 with the computer. Additionally, I show a monitor 490 coupled 492 coupled with the computer 480.

In this configuration, I teach the use of up to four hard-drives. A hard drive 500 includes an installation of operating system software 502 coupled 504 with the computer. The hard drive 500 which supports the operating system may be rather modest in size, with 540 MB to 850 MB usually adequate. Ordinarily this drive is designated as logical drive C. A hard disk drive manager 510 is coupled 506 with the operating system drive 500.

A user mode manager 512 enables the selection of any 1 of 3 different user setup combinations. When selection 1 is made it is conveyed 514 to the HDD manager 510 and signal bus 518-1 is made active as coupled with hard drive 0. This drive 520-1 which is usually designated as logical drive D supports an applications software bundle 0 and a set of user 0 files.

In a similar way, a user mode manager 512 selection of 2 enables the signal bus 518-2 coupled with a hard drive 520-2 holding software 522-2 and files 524-2. A further selection of 3 by the mode manager 512 enables the signal bus 518-3 coupled with a hard drive 520-3 holding software 522-3 and files 524-3.

Up to this point, I have taught several ways in which one hard drive out of several can be specifically selected for use by an operator, while the other hard drives are absolutely disabled and the operator can not access them. With FIG. 14 I also show that power shut-off to "the other drive" which is disabled may also be advantageous not only as a power saving consideration, but also as a further limitation on a user's ability to access a denied hard drive.

The host computer's power supply 530 ordinarily includes a cable including a connector 532 which typically carries +5 volts and +12 volts to a drive, together with two return (or ground) lines. My embodiment provides a manual control 538 which is usually coupled with the hard drive selection manager 64 (FIG. 1). I further suggest that a key 540 or the like may be used to control the selection manager 64 and manual control 538 to assure operational security. The switch contact set (or relay contacts) 542,546 may switch between lines 544-1,548-1 and lines 544-2,548-2 to route power flow either to connector 534-1 which services HDD0 power 536-1 or alternatively (but not concurrently) provides power flow to a connector 534-2 which services HDD1 power 536-2.

In its primary form, my invention enables each user a functionally independent hard disk drive which may absolutely not be accessed by another user. I anticipate that others will attempt to circumnavigate around my teachings in one manner or another. Other control lines may be utilized to enable and disable hard drives, but clearly this is an obvious variation on my specifically mentioned approaches. For example, an inclusion of an additional control line facility in a hard drive for drive selection becomes equivalent to selection process I teach utilizing user controlled remote setting of already available MASTER/SLAVE jumper states. For example, with IDE/ATA and EIDE some hard drives include a "cable select" function (typically the IDE cable pin 27) which may be utilized to obtain equivalent selection to what my master/slave swap delivers.

The utter essence of my invention to teach an independence of a computer system's operation by two or more users, or for two or more divergent application categories. I show a number of methods and device implementations for practicing the stated method which are particularly intended to allow independent operation of at least two hard disk drives within the framework of a shared computer system architecture.

When used by several distinct classes of users, my invention overcomes a potential problem wherein one user may corrupt another user's data files or operating system configuration parameters.

Another non-trivial extension for my invention is to include usage capability with Apple's computer systems which utilize the hard disk drive for program and data storage wherein each of several users may maintain incorruptible and absolutely distinct data files on physically separate and non-currently operable hard disk drives I proceed to give illustrative examples of methods and accompanying apparatus particularly suitable for practice of the invention in various operating environments, such as IDE, ATA and SCSI hard drive interface protocols. Realize also that my invention is applicable with desk-top, portable, single-board and mobile computers without a compromise in objectives.

It is necessary to realize that the numerous approaches which I now describe as illustrative are intended to respond to hardware implementations of a wide base of contemporaneous personal and small business computer system designs. I realize that it is obvious that my described approaches might be embodied to take other modified forms which can be engineered to best satisfy a particular application embodiment or take advantage of different technological parts, operational protocols or implementation techniques without departing from the underlying spirit of my invention. In particular it is well known that the rapid state of art advancement may introduce other hard disk drive interface protocols which can be adapted to my invention's fundamental teachings without departing from the overall essence of my invention. I anticipate this improvement wrought by mere technology advancement and refinement to be obvious improvement and merely the result of good engineering practices. Clearly utilization of my invention in apparatus and system upgrades is an important point to ponder, in view of the rapid advancement computer science and technology is continuing to make. I anticipate that my invention, while taught for mechanical hard disk drive application, is obviously applicable to "solid state drives" of known types when the application warrants inclusion.

What I claim for my invention is:

1. An independent disk operating system access method for a computer including plural hard disk drives, therefore comprising the steps of:

interjoining at least a first hard disk drive and a second hard disk drive to a shared interface bus;

installing a first operating system on the first hard disk drive;

installing a second operating system on the second hard disk drive;

first empowering a first user to set a hard disk drive selector to a first choice;

a first selecting of the first hard disk drive to be active in response to the first choice;

a first initializing of the first hard disk drive usually during a ROM-BIOS boot;

a first booting of the first operating system components ordinarily stored on the first hard disk drive into a first level of user-oriented operability of the computer;

an intentional resetting of the computer;

second empowering a second user to set a hard disk drive selector to a second choice;

a second selecting of the second hard disk drive to be active in response to the second choice;

a second initializing of the second hard disk drive during the ROM-BIOS boot; and, a second booting of the second operating system components ordinarily stored on the second hard disk drive into a second level of user-oriented operability of the computer.

2. The independent disk operating system access method of claim 1 further comprising the steps of:

denying access of the second hard disk drive while operating the computer under control of the first operating system; and, denying access of the first hard disk drive while operating the computer under the control of the second operating system.

3. The independent disk operating system access method of claim 1 further comprising the steps of:

restricting the first selecting of the first hard drive to a first user;

denying the first user access to the second hard drive;

restricting the second selecting of the second hard drive to a second user; and, denying the second user access to the first hard drive.

4. The independent disk operating system access method of claim 1 further comprising the steps of:

presetting the ROM-BIOS boot to singularly recognize a MASTER hard disk drive;

configuring a first physical hard drive to be functional as a MASTER and a second physical disk drive functional as a SLAVE;

recognizing the first physical hard drive as a logical Drive C and ignoring the second physical disk drive;

reconfiguring the first physical hard drive as the SLAVE and the second physical disk drive to be functional as the MASTER; and, recognizing the second physical hard drive as the logical Drive C and ignoring the first physical disk drive.

5. The independent disk operating system access method of claim 1 utilizing a SCSI bus for hard disk access and further comprising the steps of:

installing at least two SCSI compatible hard disk drives on the SCSI bus;

setting the at least two SCSI compatible hard disk drives to utilize the same device identification or SCSI-ID number;

extending a substantially separate device select /SEL data line from each said SCSI compatible hard disk drive;

enabling flow of a selection control signal between the SCSI bus /SEL data line and the selected said first hard disk drive; and, inhibiting flow of the selection control signal between the SCSI bus /SEL data line and at least the said second hard disk drive.

6. The independent disk operating system access method of claim 1 utilizing an IDE interface bus for hard disk access and further comprising the steps of:

presetting the ROM-BIOS boot to recognize only a MASTER hard drive;

coupling the first hard disk drive with the IDE interface bus;

coupling the second hard disk drive with the IDE interface bus;

first designating the first hard disk drive as the MASTER hard drive and the second hard disk drive as a SLAVE hard drive;

said first booting the MASTER hard disk drive to obtain the first level of user-oriented operability of the computer;

second designating the second hard disk drive as the MASTER hard drive and the first hard disk drive as the SLAVE hard drive;

said second booting the MASTER hard disk drive to obtain the second level of user-oriented operability of the computer; and, denying access to the designated said SLAVE hard drive by the computer.

7. The independent disk operating system access method of claim 6 further comprising the steps of:

coupling a third hard disk drive with the IDE interface bus;

third designating the third hard disk drive as the MASTER hard drive and both the first hard disk drive and the second hard disk drive as the SLAVE hard drives; and, third booting the MASTER hard disk drive to obtain a third level of user-oriented operability of the computer.

8. A hard disk drive operating method for a computer system including at least two hard disk drives and comprising the steps of:

interjoining the hard disk drives to a shared first interface bus coupled with the computer system;

first empowering a first user to first select which said hard disk drives are active and which are absolutely denied access during a first operating session;

second empowering a second user to second select which said hard disk drives are said active and which are absolutely denied access during a second operating session.

9. The hard disk drive operating method of claim 8 further comprising steps of:

installing a first bundle of software on a first hard disk drive;

installing a second bundle of software on a second hard disk drive;

presetting the computer system BIOS boot-software to recognize a primary hard drive;

first selecting the first hard disk drive as a primary hard drive;

first booting the computer system;

loading and running at least a portion of the first bundle of software;

resetting the computer system;

second selecting the second hard disk drive as the primary hard drive;

second booting the computer system; and, said loading and running at least a portion of the second bundle of software.

10. The hard disk drive operating method of claim 9 further comprising steps of:

first designating the second hard disk drive as a secondary hard drive concurrent with the first selection of the first hard disk drive as the primary hard drive; and, second designating the first hard disk drive as the secondary hard drive concurrent with the second selection of the second hard disk drive as the primary hard drive.

11. The hard disk drive operating method of claim 10 further comprising steps of denying computer system access to the secondary hard drive.

12. The hard disk drive operating method of claim 8 further comprising steps of:

hosting several SCSI hard drives on the shared first interface bus;

setting a device identification or SCSI-ID number of at least a first SCSI hard drive and a second SCSI hard drive to a like value;

first coupling a /SEL signal line comprising a SCSI interface bus exclusively with the first hard disk drive to enable a system selection of the first hard disk drive as the primary drive; and, second coupling the /SEL signal line comprising the SCSI interface bus exclusively with the second hard disk drive to enable the system selection of the second hard disk drive as the primary drive.

13. The hard disk drive operating method of claim 8 further comprising steps of:

hosting a first SCSI hard drive on the shared first interface bus;

setting a device identification or SCSI-ID number of a first SCSI hard drive to a unique value and preferably SCSI-ID=0;

first fixed coupling of a /SEL signal line comprising a SCSI interface bus with the first hard disk drive to enable a system selection of the first hard disk drive as the primary drive;

next hosting at least two additional SCSI hard drives on the shared first interface bus;

setting a device identification or SCSI-ID number of at least a second SCSI hard drive and a third SCSI hard drive to a like value dissimilar from the first drive and preferably SCSI-ID=1;

first selective coupling of the /SEL signal line comprising the SCSI interface bus with the second hard disk drive to enable a system selection of the second hard disk drive as the secondary physical hard drive; and, second selective coupling of the /SEL signal line comprising the SCSI interface bus with the third hard disk drive to enable a system selection of the third hard disk drive as the secondary physical hard drive.

14. A hard disk drive selection means enabling an interchange of PRIMARY and SECONDARY modes to at least two physical hard drive means to establish a transplacement of their logical drive assignments, comprising:

a computer means including at least two hard drive means;

a first configuring means effective for enabling an operator to electively set a first hard drive means to the PRIMARY mode and concurrently set a second hard drive means to the SECONDARY mode;

a second configuring means effective for enabling the operator to electively reset the first hard drive means to the SECONDARY mode and concurrently set the second hard drive means to the PRIMARY mode; and, an managing means for establishing a user-empowered selection of one of the first configuring means and the second configuring means usually prior to a booting of the computer means.

15. The hard disk drive selection means of claim 14 further comprising:

a ROM-BIOS means preset to singularly recognize the PRIMARY hard drive as a principal drive and to deny recognition of the SECONDARY hard drive.

16. The hard disk drive selection means of claim 14 further comprising:

a first software bundle means installed on the first hard drive means and first configured for a first user; and, a second software bundle means installed on the second hard drive means and second configured for a second user.

17. The hard disk drive selection means of claim 14 further comprising:

an IDE/ATA host adapter coupled with the computer means;

an IDE/ATA bus coupling the at least two hard drives with the IDE/ATA host adapter;

the first configuring means including a first switch means effective for defining a jumper configuration of the first hard drive means to the PRIMARY mode as a MASTER drive and defining the jumper configuration of the second hard drive means to the SECONDARY mode as a SLAVE drive; and, the second configuring means including a second switch means effective for defining jumper configuration of the first hard drive means as the SLAVE drive and defining jumper configuration of the second hard drive means as the MASTER drive.

18. The hard disk drive selection means of claim 14 further comprising:

a SCSI host adapter coupled with the computer means;

a SCSI bus coupling the at least two hard drives with the SCSI host adapter;

a device identification number entry means on each of the at least two hard drives set to an identical device number value;

the first configuring means including a switch means coupling the SEL control line portion of the SCSI bus with the SEL input of the first hard drive means and interrupting the coupling of the SEL control line with the second hard drive means; and, the second configuring means including a switch means coupling the SEL control line portion of the SCSI bus with the SEL input of the second hard drive means and interrupting the coupling of the SEL control line with the first hard drive means.

19. The hard disk drive selection means of claim 14 further comprising:

a classroom environment including the computer means;

an instructor controlled student designator means comprising the managing means;

the first configuring means responsive to a designation of a first student by the student designator means; and, the second configuring means responsive to the designation of a second student by the student designator means.

20. The hard disk drive selection means of claim 14 further comprising:

the computer means comprising an APPLE equivalent computer system;

an SCSI host adapter coupled with the APPLE equivalent computer system;

the first hard drive means supporting a first set of software and data files;

the second hard drive means supporting a second set of software and data files;

an APPLE-compatible SCSI bus coupling at least the first hard drive means and the second hard drive means with the SCSI host adapter;

a device identification number entry means on at least the first hard drive means and the second hard drive means set to an identical SCSI-ID number;

the first configuring means including a switch means coupling the /SEL control line portion of the SCSI bus with the /SEL input of the first hard drive means and interrupting the coupling of the /SEL control line with the second hard drive means; and, the second configuring means including a switch means coupling the /SEL control line portion of the SCSI bus with the /SEL input of the second hard drive means and interrupting the coupling of the /SEL control line with the first hard drive means;

whereupon, the APPLE equivalent computer system accesses data on the first hard drive means during a first interval of first user access time subsequent to a first boot and subsequently may access data on the second hard drive means during a second interval of second user access time subsequent to a second boot while access is unconditionally denied to the second hard drive means during the first interval and access is unconditionally denied to the first hard drive means during the second interval.

* * * * *